US010335742B2

(12) United States Patent
Exley

(10) Patent No.: US 10,335,742 B2
(45) Date of Patent: Jul. 2, 2019

(54) ASYMMETRIC COMPOSITE MEMBRANES AND MODIFIED SUBSTRATES USED IN THEIR PREPARATION

(71) Applicant: HYDROXSYS HOLDINGS LIMITED, Auckland (NZ)

(72) Inventor: Mark Exley, Auckland (NZ)

(73) Assignee: HYDROXSYS HOLDINGS LIMITED, Auckland (NZ)

(*) Notice: Subject to any disclaimer, the term of this patent is extended or adjusted under 35 U.S.C. 154(b) by 0 days.

(21) Appl. No.: 15/539,903

(22) PCT Filed: Dec. 28, 2015

(86) PCT No.: PCT/IB2015/060001
§ 371 (c)(1),
(2) Date: Jun. 26, 2017

(87) PCT Pub. No.: WO2016/103239
PCT Pub. Date: Jun. 30, 2016

(65) Prior Publication Data
US 2018/0015424 A1    Jan. 18, 2018

(30) Foreign Application Priority Data
Dec. 24, 2014  (AU) ................ 2014905278

(51) Int. Cl.
*B01D 67/00*    (2006.01)
*B01D 71/52*    (2006.01)
(Continued)

(52) U.S. Cl.
CPC ............ *B01D 67/0093* (2013.01); *A23C 9/14* (2013.01); *B01D 67/009* (2013.01); *B01D 69/12* (2013.01);
(Continued)

(58) Field of Classification Search
CPC .......... B01D 2323/30; B01D 2323/345; B01D 2325/022; B01D 2325/36; B01D 2325/38;
(Continued)

(56) References Cited

U.S. PATENT DOCUMENTS 4,933,083 A    6/1990 Jones, Jr.
4,976,897 A    12/1990 Callahan et al.
(Continued)

FOREIGN PATENT DOCUMENTS

CN    103421208    12/2013
WO    WO 93/01622    1/1993
(Continued)

OTHER PUBLICATIONS

Kitty Nymeijer, Tynnen Visser, Rijanne Assen, Matthias Wessling; Journal of Membrane Science 232 (2004) 107-114. (Year: 2004).*
(Continued)

*Primary Examiner* — Pranav N Patel
(74) *Attorney, Agent, or Firm* — Nixon & Vanderhye P.C.

(57) ABSTRACT

Durable asymmetric composite membranes consisting of a film of cross-linked poly(ether ether ketone) adhered to a sheet of hydrophilic microporous poly(ethylene) are disclosed. The membranes are suitable for use in the recovery or removal of water from feed streams where repeated clean-in-place protocols are required such as in the processing of dairy products.

7 Claims, 16 Drawing Sheets

(51) Int. Cl.
    A23C 9/14    (2006.01)
    B01D 69/12   (2006.01)
    B01D 71/26   (2006.01)
(52) U.S. Cl.
    CPC .............. B01D 71/26 (2013.01); B01D 71/52
            (2013.01); B01D 2323/30 (2013.01); B01D
                                2325/022 (2013.01)
(58) Field of Classification Search
    CPC .............. B01D 67/0006; B01D 67/009; B01D
            67/0093; B01D 69/10; B01D 69/125;
            B01D 69/105; B01D 69/12; B01D 71/82;
                            B01D 71/52; B01D 71/26
    See application file for complete search history.

(56) References Cited

U.S. PATENT DOCUMENTS

| | | |
|---|---|---|
| 5,013,439 A | 5/1991 | Fisher et al. |
| 5,049,275 A | 9/1991 | Gillberg-LaForce et al. |
| 5,102,552 A | 4/1992 | Callahan et al. |
| 5,160,627 A | 11/1992 | Cussler et al. |
| 5,266,391 A | 11/1993 | Donato et al. |
| 5,294,342 A | 3/1994 | Donato |
| 5,294,346 A | 3/1994 | Donato et al. |
| 5,328,760 A | 7/1994 | Gillberg-LaForce |
| 6,384,100 B1 | 5/2002 | Choi |
| 6,680,144 B2 | 1/2004 | Choi |
| 6,955,865 B2 | 10/2005 | Choi |
| 2006/0121217 A1 | 6/2006 | Childs et al. |
| 2008/0197070 A1 | 8/2008 | Sirkar et al. |

FOREIGN PATENT DOCUMENTS

| | | |
|---|---|---|
| WO | WO 2010/002502 | 1/2010 |
| WO | WO 2015/147657 | 10/2015 |
| WO | WO 2015/147657 A1 | 10/2015 |

OTHER PUBLICATIONS

Nymeijer K., et al; "Super selective membranes in gas-liquid membrane contactors for olefin/paraffin separation"; *Journal of Membrane Science*, vol. 232, pp. 107-114 (2004).
Abstract of Bai et al (2011) Surface UV photografting of acrylic acid onto LDPE powder and its adhesion *Shenyang Huagong Daxue Xuebao* 25(2), 121-125.
Abstract of El Kholdi et al (2004) Modification of adhesive properties of a polyethylene film by phtografting *Journal of Applied Polymer Science* 92(5), 2803-2811.
Abstract of Shentu et al (2002) Factors affecting photo-grafting on low density polyethylene *Hecheng Suzhi Ji Suliao* 19(3), 5-8.
Abstract of Xu and Yang (2000) Study on the mechanism of LDPE-AA vapor-phase photografting system, *Gaofenzi Xuebao*, 5, 594-598.
Allimér et al (1988) Surface modification of polymers. I. Vapour-phase photografting with acrylic acid, *Journal of Polymer Science, Part A: Polymer Chemistry*, 26(8), 2099-2111.
Allmér et al (1989) Surface modification of polymers. II. Grafting with glycidyl acrylates and the reactions of the grafted surfaces with amines, *Journal of Polymer Science: Part A: Polymer Chemistry*, 27, 1641-1652.
Ang et al (1980) Photosensitized grafting of styrene, 4-vinylpyridine and methyl methacrylate to polypropylene, *Journal of Polymer Science: Polymer Letters Edition*, 18, 471-475.
Anon (2014) Dow Filmtec™ Membranes—Cleaning procedures for Dow Filmtec FT30 elements Tech Fact (Form No. 609-23010-0211).
Causserand and Aimar (2010) 1.15 Characterisation of filtration membranes In Comprehensive membrane science and engineering Drioli, E; Gioma, L. eds. Oxford Elsevier.
Drioli et al (2003) Sulfonated PEEK-WC membranes for possible fuel cell applications, *Journal of Membrane Science* 228 (2004) 139-148.
Edge et al (1993) Surface modification of polyethylene by photochemical grafting with 2-hydroxyethylmethacrylate, *Journal of Applied Polymer Science*, 47, 1075-1082.
Kubota and Hata (1990) Benzil-sensitized photografting of methacrylic acid on low-density polyethylene film, *Journal of Applied Polymer Science*, 40, 1071-1075.
Kubota and Hata (1990) Distribution of methacrylic acid-grafted chains introduced into polyethylene film by photografting, *Journal of Applied Polymer Science*, 41, 689-695.
Ogiwara et al (1981) Photosensitized grafting on polyolefin films in vapor and liquid phases, *Journal of Polymer Science: Polymer Letters Edition*, 19, 457-462.
Tazuke and Kimura (1978) Surface photografting. I. Graft polymerization of hydrophilic monomers onto various polymer films, *Journal of Polymer Science: Polymer Letters Edition*, 16, 497-500.
Yang and Rånby (1996) Bulk surface photografting process and its applications. II. Principal factors affecting surface photografting, *Journal of Applied Polymer Science*, 62, 545-555.
Yao and Rånby (1990) Surface modification by continuous graft copolymerization. I. Photoinitiated graft copolymerization onto polyethylene tape film surface, *Journal of Applied Polymer Science*, 40, 1647-1661.
Yao and Rånby (1990) Surface modification by continuous graft copolymerization. III. Photoinitiated graft copolymerization onto poly(ethylene terephthalate) fiber surface, *Journal of Applied Polymer Science*, 41, 1459-1467.
Yao and Rånby (1990) Surface modification by continuous graft copolymerization. IV. Photoinitiated graft copolymerization onto polypropylene fiber surface, *Journal of Applied Polymer Science*, 41, 1469-1478.
Zhang and Rånby (1991) Surface modification by continuous graft copolymerization. II. Photoinitiated graft copolymerization onto polypropylene film surface, *Journal of Applied Polymer Science*, 43, 621-636.
International Search Report issued in PCT/IB2015/06001 dated Mar. 29, 2016.

* cited by examiner

ASYMMETRIC COMPOSITE MEMBRANES AND MODIFIED SUBSTRATES USED IN THEIR PREPARATION

This application is the U.S. national phase of International Application No. PCT/IB2015/060001 filed Dec. 28, 2015 which designated the U.S. and claims priority to Australian Patent Application No. 2014905278 filed Dec. 24, 2014, the entire contents of each of which are hereby incorporated by reference.

TECHNICAL FIELD

The invention relates in part to modifying the chemical and physical properties of microporous polyolefin substrates. The invention further relates to asymmetric composite membranes prepared using these modified substrates. In particular, the invention relates to the use of modified microporous polyethylene sheets in the preparation of durable asymmetric composite membranes for use in the removal of water from dairy feed streams.

BACKGROUND ART

It is well-known to use photografting to modify the surface of films, sheets and molded objects formed from polyolefins. For example, the publication of Tazuke and Kimura (1978) discloses photografting onto poly(propylene), poly(ethylene) and several other polymer films using benzophenone as a sensitizer. In this publication the choice of solvent and sensitizer was noted to be very important. The publication of Ang et al (1980) discloses an irradiation procedure where the sensitizer is dissolved in the hydrophilicitizing agent solution and can be used for the photosensitized copolymerization in high yields of styrene, 4-vinyl pyridine and methyl methacrylate to poly(propylene). Again, this publication notes that the reaction was found to be very specific to certain types of sensitizers.

The publication of Ogiwara et al (1981) discloses the photografting on poly(propylene) and low-density poly(ethylene) (LDPE) films on which sensitizers were coated beforehand. The sensitizers coated on films enabled vinyl hydrophilicitizing agents, such as methyl methacrylate, acrylic acid and methacrylic acid to graft easily with high yields. The hydrophilic hydrophilicitizing agents acrylic acid and methacrylic acid were conveniently grafted using them in aqueous solution in a liquid phase system. The publication of Allmer et al (1988) discloses the modification of surfaces of LDPE, high-density poly(ethylene) (HDPE) and polystyrene by grafting with acrylic acid. The grafting is performed in the vapor-phase and increased the wettability of the polymer. It was observed that acetone was able to initiate grafting and was found to promote and direct grafting to the surface. The publication of Allmer et al (1989) discloses the grafting of the surface of LDPE with glycidyl acrylate and glycidyl methacrylate by photoinitiation. Acetone and ethanol were used as solvents, with acetone yielding slightly more grafting at the surface.

The publications of Yao and Ranby (1990a, 1990b and 1990c) disclose inter alia a process for the continuous photoinitiated graft copolymerization of acrylamide and acrylic acid onto the surface of HDPE tape film. The process is performed under a nitrogen atmosphere using benzophenone as the photoinitiator. It was noted that pre-soaking was very important for efficient photografting within short irradiation times. The application of this pre-soaking photografting method to poly(ethylene terephthalate) (PET) was also disclosed. In this context acetone was found to be a somewhat better solvent than methylethyl ketone and methylpropyl ketone. When applied to a continuous process for the photochemically induced graft polymerization of acrylamide and acrylic acid of poly(propylene) (PP) fiber surface under a nitrogen atmosphere, optimal concentrations of hydrophilicitizing agent and initiator in the pre-soaking solution were determined.

The publications of Kubota and Hata (1990a and 1990b) disclose an investigation of the location of methacrylic acid chains introduced into poly(ethylene) film by liquid and vapor-phase photograftings and a comparative examination of the photografting behaviours of benzil, benzophenone and benzoin ethyl ether as sensitizers. In these latter studies poly(methacrylic acid) was grafted onto initiator-coated LDPE film.

The publication of Edge et al (1993) discloses the photochemical grafting of 2-hydroxyethyl methacrylate (HEMA) onto LDPE film. A solution phase method is used to produce a material with increased wettability. The publication of Singleton et al (1993) discloses a method of making a polymeric sheet wettable by aqueous solvents and useful as an electrode separator in an electrochemical device. The polymeric sheet is formed from fibers which comprise poly(propylene) alone and is distinguished from a membrane formed from a microporous polymer sheet. The publication of Zhang and Ranby (1993) discloses the photochemically induced graft copolymerisation of acrylamide onto the surface of PP film. Acetone was shown to be the best solvent among the three aliphatic ketones tested.

The publications of Yang and Ranby (1996a and 1996b) disclose factors affecting the photografting process, including the role of far UV radiation (200 to 300 nm). In these studies benzophenone was used as the photoinitiator and LDPE film as the substrate. Added water was shown to favour the photografting polymerisation of acrylic acid on the surface of polyolefins, but acetone was shown to have a negative effect due to the different solvation of poly(acrylic acid) (PAA).

The publication of Hirooka and Kawazu (1997) discloses alkaline separators prepared from unsaturated carboxylic acid grafted poly(ethylene)-poly(propylene) fiber sheets. Again, the sheets used as a substrate in these studies are distinguished from a membrane formed from a microporous polymer sheet.

The publication of Xu and Yang (2000) discloses a study on the mechanism of vapor-phase photografting of acrylic acid in LDPE. The publication of Shentu et al (2002) discloses a study of the factors, including the concentration of hydrophilicitizing agent, affecting photo-grafting on low-density LDPE. The publication of El Kholdi et al (2004) discloses a continuous process for the graft polymerisation of acrylic acid from hydrophilicitizing agent solutions in water onto LDPE. The publication of Bai et al (2011) discloses the preparation of a hot melt adhesive of grafted low-density poly(ethylene) (LDPE). The adhesive is prepared by surface UV photografting of acrylic acid onto the LDPE with benzophenone as the photoinitiator.

The publication of Choi et al (2001) states that graft polymerisation is considered as a general method for modifying the chemical and physical properties of polymer materials.

The publication of Choi (2002) discloses a method for producing an acrylic graft polymer on the surface of a polyolefin article comprising the steps of immersing the article in a solution of an initiator in a volatile solvent, allowing the solvent to evaporate, and then immersing the article in a solution of an acrylic hydrophilicitizing agent before subjecting the article to ultraviolet irradiation in air or an inert atmosphere. Acrylic acid is used as the acrylic hydrophilicitizing agent in each one of the Examples disclosed in the publication, although the use of equivalent amounts of methacrylic acid, acrylamide and other acrylic hydrophilicitizing agents is anticipated.

The publication of Choi (2004) discloses the use of "ethylenically unsaturated hydrophilicitizing agents" in graft polymerisation. These other hydrophilicitizing agents are disclosed as hydrophilicitizing agents that are polymerisable by addition polymerisation to a thermoplastic polymer and are hydrophilic as a consequence of containing carboxyl (—COOH), hydroxyl (—OH), sulfonyl ($SO_3$), sulfonic acid (—$SO_3H$) or carbonyl (—CO) groups. No experimental results concerning the chemical and physical properties of graft polymers prepared by a method using these other hydrophilicitizing agents is disclosed.

The publication of Choi (2005) discloses a non-woven sheet of polyolefin fibres where opposed surfaces of the sheet are hydrophilic as a consequence of an acrylic graft polymerisation. The properties of the sheet are asymmetric, the ion exchange coefficient of the two surfaces being different. The method used to prepare these asymmetric acrylic graft polymerised non-woven polyolefin sheets comprises the steps of immersing the substrates in a solution of benzophenone (a photoinitiator), drying and then immersing the substrate in a solution of acrylic acid prior to subjecting to ultraviolet (UV) irradiation. The irradiation may be performed when the surfaces are in contact with either air or an inert atmosphere.

The publication of Gao et al (2013) discloses a method of preparing a radiation cross-linked lithium-ion battery separator. In an example, a porous polyethylene membrane is immersed in a solution of benzophenone and triallyl cyanurate in dichloromethane. The immersed membrane is dried at room temperature before being immersed in a water bath at 30° C. and irradiated on both sides using a high-pressure mercury lamp for three minutes.

The objective of the majority of these prior art methods is to improve the adhesion, biocompatibility, printability or wettability of the surface of a substrate. These improvements to surface characteristics are to be distinguished from the use of UV-initiated polymerisation to modify the permeability of preformed microporous polyolefin substrates, such as the substrates described in the publications of Fisher et al (1991) and Gillberg-LaForce (1994).

It is well-known to prepare thin film composite membranes to modify the permeability of a preformed microporous polyolefin substrate. For example, the publication of Jones (1990) discloses a composite permselective membrane comprising an ultrathin semipermeable layer comprising a polybenzimidazole polymer in occluding contact with at least one surface of a microporous polymer support layer. The membranes are asserted to provide better combinations of flux and rejection rates in reverse osmosis processes than do conventional semipermeable membranes of polybenzimidazole polymer alone.

The publication of Callahan and Johnson (1990) discloses a composite membrane having a microporous support which is coated with a UV curable polymer composition having a sufficiently high viscosity to prevent pore filling upon coating and curing.

The publication of Gillberg-LaForce and Gabriel (1991) discloses a pore modified microporous membrane which is made by a process of incorporating a polymerizable vinyl hydrophilicitizing agent within the pores of a microporous membrane followed by polymerization to secure the resulting polymer within the pores. The process is stated to be particularly suitable for modifying a hydrophobic microporous membrane with a hydrophilic polymer, as occurs for example when polyacrylic acid is secured into the pores of a polypropylene microporous membrane.

The publication of Callahan and Johnson (1992) discloses a composite membrane having a microporous support which is coated with a UV curable polymer composition having a sufficiently high viscosity to prevent pore filling upon coating and curing.

The publication of Cussler et al (1992) discloses a process for modifying the properties of a hydrophobic microporous membrane which includes the steps of treating a hydrophobic microporous membrane with a surfactant to render the membrane hydrophilic, permeating the membrane with a polyol, and crosslinking the polyol to yield a hydrophilic microporous membrane having pores filled with an aqueous gel. The modified membranes are asserted to be useful in carrying out chromatographic separations.

The publication of Donato and Phillips (1993) discloses a composite membrane having a microporous support which is coated with a polymer selected from the group consisting of polyethylene oxide, polyacrylic acid, poly(methyl methacrylate) and polyacrylamide wherein there is no pore filing of the microporous support. The publication of Donato (1994) discloses a composite membrane having a microporous support coated with an aqueous polyeurethane dispersion composition. The publication of Donato and Phillips (1994) discloses a composite membrane having a microporous support which is coated with a polymer composition and a contact adhesive layer applied to said polymer.

For the most part, the methods of preparing composite membranes disclosed in these publications use UV initiated polymerisation to form polymers in situ. Methods of adhering dissimilar preformed polymers to the surface of the microporous polyolefin substrates are less well known.

It is an object of the present invention to provide a method of decreasing the hydrophobicity of preformed microporous poly(ethylene) sheets and thereby provided modified microporous polyethylene sheets suitable for use in the preparation of water permeable asymmetric composite membranes. It is an object of the present invention to provide an asymmetric composite membrane suitable for use in the recovery or removal of water from dairy and other feed streams. These objects are to be read in the alternative with the object at least to provide a useful choice.

DISCLOSURE OF INVENTION

In a first aspect the invention provides a method of preparing an asymmetric composite membrane comprising the steps:
1. Contacting one side of a sheet of hydrophilicitized microporous polyolefin with a dispersion in an organic solvent of sulfonated poly(ether ether ketone) and at least one cross-linking agent to provide a coated sheet; and then
2. Irradiating the one side of the coated sheet at a wave length and an intensity for a time sufficient to provide the asymmetric composite membrane.

In an embodiment of the first aspect, the invention provides a method of preparing an asymmetric composite membrane comprising the steps:
1. Irradiating a dispersion comprising sulfonated poly (ether ether ketone) and at least one cross-linking agent in an organic solvent to provide a partially cross-linked dispersion of sulfonated poly(ether ether ketone);
2. Contacting one side of a sheet of wetted microporous polyolefin with the dispersion of partially cross-linked sulfonated poly(ether ether ketone);
3. Irradiating the one side of the coated sheet at a wave length and an intensity for a time sufficient to adhere the cross-linked sulfonated poly(ether ether ketone) to the sheet of microporous polyolefin to provide a composite; and then
4. Drying the composite at a temperature and time sufficient to provide the asymmetric composite membrane, where the sheet of wetted microporous polyolefin is wetted with a solution of a hydrophilicitizing agent in an aqueous solvent.

Preferably, the aqueous solvent is 40 to 60% (v/v) acetone in water.

Preferably, the hydrophilicitizing agent is 4-ethenyl-benzenesulfonic acid.

Preferably, the hydrophilic microporous polyolefin is a graft polymer. More preferably, the side chains of the graft polymer are derived from one or more of 2-acrylamido-1-methyl-2-propanesulfonic acid, 2-propen-1-ol, 2-propenoic acid, 2-hydroxyethyl 2-methyl-2-propenoic acid ester and 4-ethenyl-benzenesulfonic acid. Yet more preferably, the side chains of the graft polymer are derived from either or both of 2-acrylamido-1-methyl-2-propanesulfonic acid and 4-ethenyl-benzenesulfonic acid. Most preferably, the side chains of the graft polymer are derived from 4-ethenyl-benzenesulfonic acid.

Preferably, the organic solvent is dimethylacetamide.

Preferably, the cross-linking agent is a di-, tri- or tetraethenyl compound with a molecular weight less than 260. More preferably, the cross-linking agent is a di- or tetraethenyl compound selected from the group consisting of: divinylbenzene, ethylene glycol dimethacrylate and glyoxal bis(diallyl acetal). Most preferably, the cross-linking agent is p-divinylbenzene.

Preferably, the ratio of cross-linking agent to sulfonated poly(ether ether ketone) is in the range 2:3 to 1:3. More preferably, the ratio of cross-linking agent to sulfonated poly(ether ether ketone) is 1:2.

Preferably, the dispersion additionally includes at least one hydrophilicitizing agent. More preferably, the at least one hydrophilicitizing agent is 2-acrylamido-1-methyl-2-propanesulfonic acid, 4-ethenyl-benzenesulfonic acid, or a salt thereof. Most preferably, the at least one hydrophilicitizing agent is 4-ethenyl-benzenesulfonic acid.

Preferably, the dispersion comprises a photoinitiator. Most preferably, the photoinitiator is benzophenone.

Preferably, the concentration of photoinitiator is greater than 2% (w/w). More preferably, the concentration of photoinitiator is greater than 4% (w/w).

Preferably, the irradiating is at wavelengths greater than 350 nm and at an intensity equivalent to 0.1 mW mil at a distance of 50 mm.

Preferably, the irradiating is for a time of 60 to 120 seconds. More preferably, the irradiating is for a time of 80 to 100 seconds In a second aspect the invention provides an asymmetric composite membrane consisting essentially of a film of cross-linked sulfonated poly(ether ether ketone) adhered to a sheet of hydrophilic microporous polyolefin.

Preferably, the film of cross-linked sulfonated poly(ether ether ketone) is an interpenetrating film of cross-linked sulfonated poly(ether ether ketone).

In a third aspect the invention provides a method of removing water from a feed stream comprising the step of contacting the asymmetric composite membrane of the second aspect of the invention with the feed stream at a pressure and temperature sufficient to produce permeate.

Preferably, the feed stream is a dairy product. More preferably, the feed stream is milk. Most preferably, the feed stream is whole milk.

Preferably, the pressure is in the range 10 to 40 bar. More preferably, the pressure is in the range 15 to 35 bar. Most preferably, the pressure is 20±2.5 bar.

Preferably, the temperature is in the range 2 to 98° C. More preferably, the temperature is in the range 4 to 40° C. Most preferably, the temperature is in the range 4 to 20° C.

In a fourth aspect the invention provides a method of preparing a hydrophilic microporous polyolefin substrate comprising the steps of:
1. Contacting a microporous polyolefin substrate with a solution of a hydrophilicitizing agent and a photoinitiator;
2. UVA irradiating the contacted substrate at an intensity and for a time sufficient to provide a graft polymer; and then
3. Removing non-grafted polymerised hydrophilicitizing agent, where the concentration of the photoinitiator in the solution is close to its limit of solubility in the solution.

Preferably, the contacting is under an atmosphere of air.

Preferably, the microporous polyolefin substrate is a sheet of microporous polyolefin. More preferably, the polyolefin is selected from the group consisting of: polyethylene, polypropylene, polybutylene and polymethylpentene. Most preferably, the polyolefin is polyethylene.

Preferably, the microporous polyethylene substrate is prepared according to a method disclosed in the publications of Fisher et al (1991) and Gillberg-LaForce (1994).

Preferably, the solution is a solution in 40 to 60% (v/v) acetone in water. More preferably, the solution is a solution in 50% (v/v) acetone in water.

Preferably, the photoinitiator is selected from the group consisting of: aceto-phenone, anthraquinone, benzoin, benzoin ether, benzoin ethyl ether, benzil, benzil ketal, benzophenone, benzoyl peroxide, n-butyl phenyl ketone, iso-butyl phenyl ketone, fluorenone, propiophenone, n-propyl phenyl ketone and iso-propyl phenyl ketone. Most preferably, the photoinitiator is benzophenone.

Preferably, the UVA irradiating is at wavelengths greater than 350 nm.

Preferably, the UVA irradiating is for a time no greater than 5 minutes.

Preferably, the removing non-grafted polymer is by washing in water. More preferably, the removing non-grafted polymer is by washing in water at a temperature of 40 to 50° C.

In the description and claims of this specification the following acronyms, terms and phrases have the meaning provided: "bursting strength" means the maximum uniformly distributed pressure applied at right angles to its surface, that a single sample location can withstand under test conditions; "close to its limit of solubility" means an increase in concentration of 5% (w/v) or more causes at least a portion of the solute to come out of solution, e.g. as a precipitate; "comprising" means "including", "containing" or "characterized by" and does not exclude any additional element, ingredient or step; "consisting essentially of" means excluding any element, ingredient or step that is a material limitation; "consisting of" means excluding any element, ingredient or step not specified except for impurities and other incidentals; "crosslinking agents" means materials that are incorporated into the crosslinking bridge of a polymer network; "crosslinking" means the formation of a three-dimensional polymer network by covalent bonding between the main chains of the polymer; "csPEEK" means chlorosulfonated PEEK; "degree of sulfonation" means the ratio of moles of sulfonated structural repeating units to total moles of structural repeating units expressed as a percentage; "DMAc" means dimethylacetamide; "DS" means degree of sulfonation; "durable" means capable of maintaining performance during repeated clean-in-place (CIP) protocols; "ethenyl" means having a terminal ethylene function (vinyl); "flow" means the rate at which a feed stream is introduced; "flux" means the rate of permeate transported per unit of membrane area; "gfd" means gallons per square foot per day; "graft polymer" means a polymer in which the linear main chain has attached to it at various points macromolecular side chains of a structure different from the main chain; "homopolymer" means a polymer formed by the polymerization of a single monomer; "hydrophilic" means having a tendency to mix with, dissolve in, or be wetted by water and "hydrophilicity" has a corresponding meaning; "hydrophilicitizing agents" means materials that are incorporated into a polymer network to impart hydrophilic properties; "hydrophobic" means having a tendency to repel or fail to mix with water and "hydrophobicity" has a corresponding meaning; "interpenetrating" means a comingling of two polymer networks; "LMH" means liters per square meter per hour; "microporous" means consisting of an essentially continuous matrix structure containing substantially uniform small pores or channels distributed uniformly throughout the body of the substrate and specifically excludes a discontinuous matrix of woven or non-woven fibres; "non-aqueous" means initially excluding water; "passage" means the percentage of dissolved species in the feed stream allowed to pass through the membrane; "PEEK" means poly(oxy-1,4-phenyleneoxy-1.4-phenylenecarbonyl-1,4-phenylene); "permeate" means the at least partially purified product water; "photoinitiator" means a photolabile compound which upon irradiation forms a radical; "polymer blend" means a homogenous or heterogeneous physical mixture of two or more polymers; "post-treated polymer" means a polymer that is modified, either partially or completely, after the basic polymer backbone has been formed; "preformed" means formed beforehand, i.e. prior to treatment; "recovery" means the percentage of the feed stream that emerges from the system as product water or "permeate"; "rejection" means the percentage of solids concentration removed from the feed stream by the membrane; "sPEEK" means sulfonated PEEK; "structural repeating unit" means a smallest structural unit that repeats in the polymer backbone, e.g. oxy-1,4-phenyleneoxy-1.4-phenylenecarbonyl-1,4-phenylene is the structural repeating unit of PEEK; "tensile strength" means the maximum tensile stress sustained by a specimen at the yield point (tensile strength at yield) or at break (tensile strength at break) during a tension test; "UVA" means electromagnetic radiation having wavelengths between 320 and 400 nm and "UVB" means electromagnetic radiation having wavelengths between 290 and 320 nm.

The phrase "rejection layer" is used synonymously with the phrase "barrier layer" and the phrase "backing layer" is used synonymously with the phrase "support layer". The term "film" is generally used when referring to the rejection layer of the asymmetric composite membrane and the term "sheet" is generally used when referring to the backing layer of the asymmetric composite membrane. Any reference to a "preformed microporous substrate" specifically excludes a preformed post-treated polymer.

In the absence of further limitation the use of plain bonds in the representations of the structures of compounds encompasses the diastereomers, enantiomers and mixtures thereof of the compounds. The use of double bonds in the representations of aromatic ring structures does not exclude delocalisation of the π-electrons and encompasses alternative representations of the same aromatic ring structures.

The terms "first", "second", "third", etc. used with reference to elements, features or integers of the subject matter defined in the Statement of Invention and Claims, or when used with reference to alternative embodiments of the invention are not intended to imply an order of preference.

Where concentrations or ratios of reagents or solvents are specified, the concentration or ratio specified is the initial concentration or ratio of the reagents or solvents. Where values are expressed to one or more decimal places standard rounding applies. For example, 1.7 encompasses the range 1.650 recurring to 1.749 recurring.

The invention will now be described with reference to embodiments or examples and the figures of the accompanying drawings pages.

DETAILED DESCRIPTION

Figure 1:
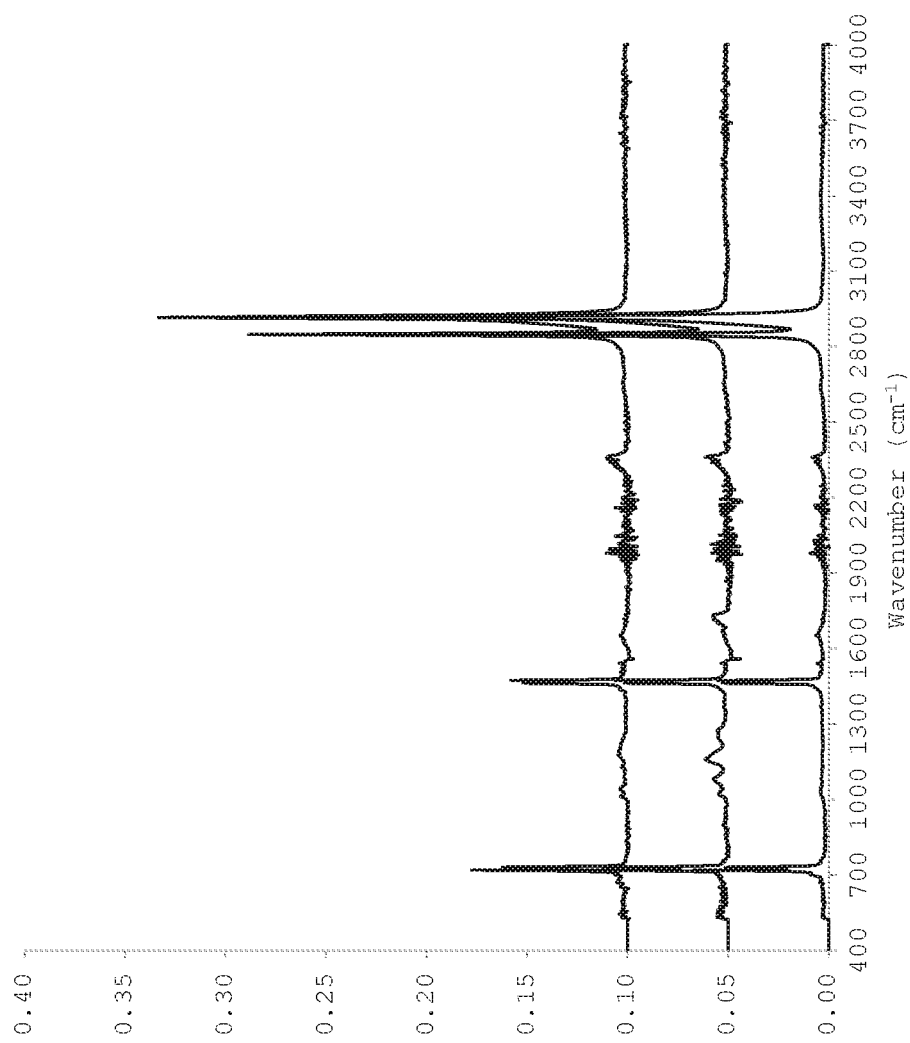
FIG. 1. Comparison of the FTIR spectra obtained for Sample 1 (lower trace), Sample 3 (middle trace) and Sample 4 (upper trace). An FTIR spectrum was not obtained for Sample 2.

The invention resides in part in the preparation of water permeable hydrophilic microporous polyethylene (μPE) sheets that may be advantageously used as a backing layer in the preparation of a durable asymmetric composite membrane. According to the invention the backing layer is prepared by the photoinitiated graft polymerisation of a sheet of μPE with selected hydrophilicitizing agents (Table 1). The hydrophilicitizing agent is selected to provide graft polymers with the chemical and physical properties dictated by the intended use of the asymmetric composite membrane. The method uses UVA irradiation to reduce the risk of harm to operators and permit the rate and degree of modification of the microporous polyolefin substrate to be readily controlled. The period of irradiation of the microporous substrate is limited to less than 5 minutes. In addition, the use of a solvent system (e.g. 1:1 (v/v) acetone-water) in which the photoinitiator (e.g. benzophenone) is close to its limit of solubility is believed to promote the deposition of the photoinitiator on the walls of the pores of the microporous polyolefin substrate. In the context of preparing water permeable membranes using acrylic acid as the hydrophilicitizing agent this selection of parameters has been found to provide a μPE sheet suitable for use in ultrafiltration of feed streams such as whole milk. In the context of preparing a durable (i.e. chlorine tolerant) asymmetric composite membrane, the selection of 4-ethenyl-benzenesulfonic acid (SSS) as the hydrophilicitizing agent has been found to provide a hydrophilic μPE sheet particularly suited for use in the preparation of the membrane.

Preparation of Hydrophilic Microporous Polyolefin

A microporous polyolefin substrate is contacted with a solution of 1% (w/v) photoinitiator and 6% (w/v) hydrophilicitizing agent in 1:1 (v/v) acetone-water. The contacted substrate is then UVA-irradiated at a peak wavelength of 368 nm for a maximum of 5 minutes. The irradiated substrate is finally washed using ultrasound in an excess of water followed by soaking in water. It was observed that a lower contact angle was achievable when irradiation of the contacted substrate occurred with the photoinitiator in solution (as opposed to being dried on the surface of the substrate).

For the preparation of samples A to D of modified polyolefin substrate according to the general method, sheets (20 μm thickness) of porous (45% porosity, 0.08 μm average pore diameter) poly(ethylene) (CELGARD™ K2045, Celgard LLC) were used as the polyolefin substrate. The solution was prepared by mixing benzophenone (photoinitiator) with acetone before adding water and then the selected hydrophilicitizing agent. The polyolefin substrate was contacted with the solution by placing a sheet of the substrate in a clear polyethylene bag and then using a threaded rod to apply the solution to the substrate. Any residual air was then removed from the bag before sealing and hanging from a frame. Irradiation was for three and a half minutes using UV fluorescent lamps (368 nm) having a bulb irradiance of 0.1 mW m$^{-1}$ at a distance of 50 mm. The ultrasound washing was for five minutes followed by soaking at 45° C. for three hours.

For the preparation of Sample E amounts of 0.6 g of the hydrophilicitizing agent sodium 4-vinylbenzene sulphonate and 0.1 g of the photoinitator benzophenone were dissolved in water (5 mL) and acetone (5 mL). The solution was then applied to a microporous polyethylene sheet on a glass plate using a threaded rod. Three applications were made until the polyethylene was wetted out. The glass plate and sample were then placed in a polyethylene plastic bag then clamped to a frame and cured using fluorescent UV lamps at a distance of 5 cm on both sides of the sample. The peak wavelength of the lamps was 368 nm and an irradiance power of 0.2 to 0.4 mW/m for each lamp. The lamps were placed in a line with 50 mm centres. The time the samples were irradiated was 210 seconds. The samples were then removed from the polyethylene bag and washed in 45° C. water for 10 seconds to removed excess polymer and unreacted hydrophilicitizing agent and put in an oven to dry for 30 minutes at 65° C. The samples were then removed from the glass plate by immersion in a water bath and extracted in a beaker of deionised water for three hours. Sample F was prepared by the same method as used for the preparation of Sample E, but with a volume of 0.6 mL of the hydrophilicitizing agent acrylic acid being substituted for the hydrophilicitizing agent sodium 4-vinylbenzene sulphonate and added after the benzophenone was dissolved in the solvent. Sample G was prepared by the same method as used for the preparation of Sample E, but with a volume of 0.6 mL of the hydrophilicitizing agent 2-hydroxyethyl methacrylate being substituted for the hydrophilicitizing agent sodium 4-vinylbenzene sulphonate and added after the benzophenone was dissolved in the solvent. The properties of samples of modified polyolefin substrate prepared using different hydrophilicitizing agents were assessed.

bubble method as described in the publication of Causserand and Aimar (2010). The samples were immersed in deionized water with the surface to be analysed facing downwards. An air bubble was trapped on the lower surface of the sample using a syringe. An image of the bubble was captured and the contact angle was calculated from its geometrical parameters.

Permeability and Flux Testing

Permeability was determined by measuring the flux in deionized water at various pressures starting at 20 bar and decreasing in 4 bar iterations. Flux $J_V$ was then graphed against effective pressure difference across the membrane, $p_{eff}$, and the slope of the permeability $L_p$.

$$L_p = \frac{J_V}{\Delta p_{eff}}$$

Figure 13:
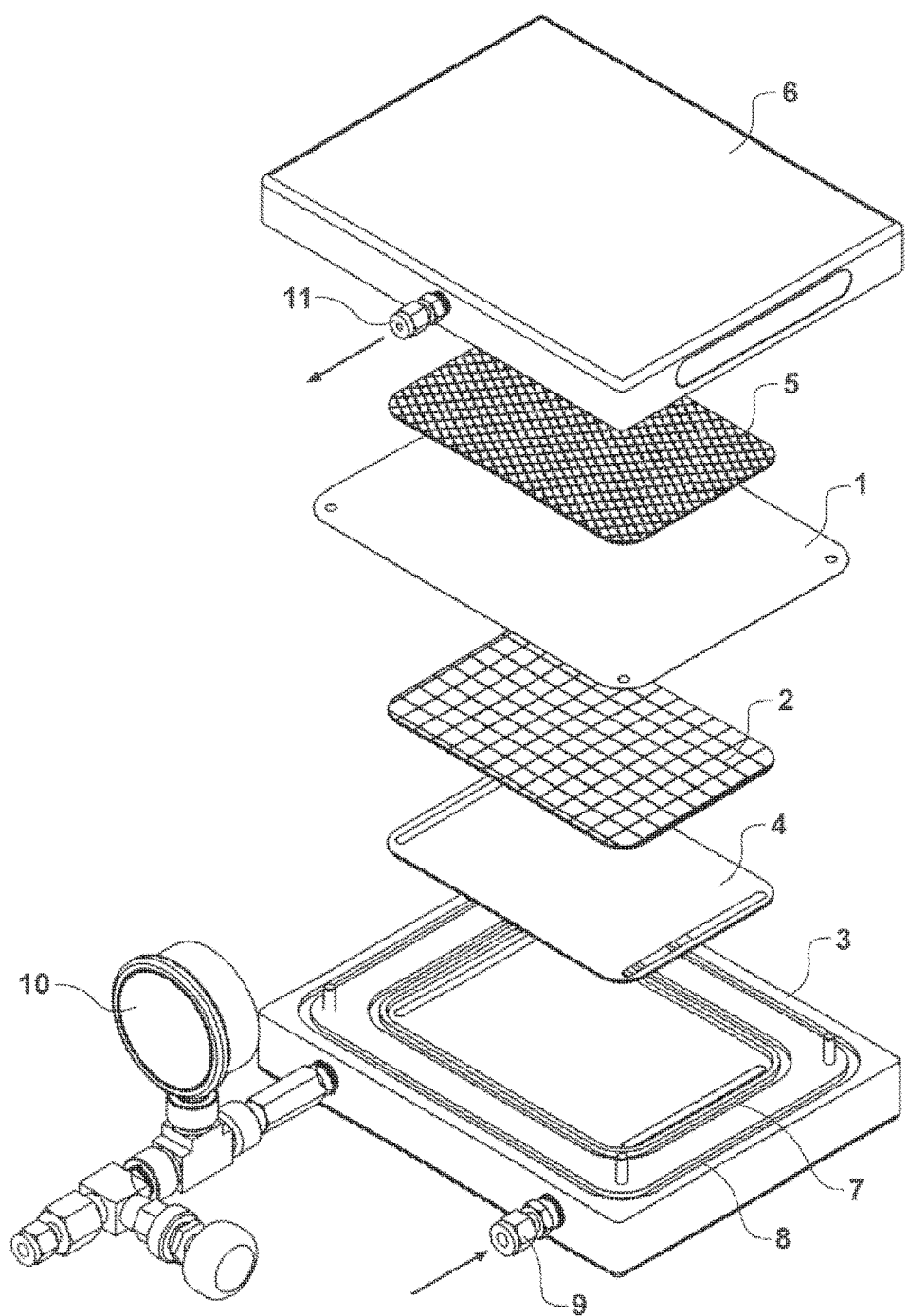
FIG. 13. Exploded view of the filter assembly (Sterlitech Corp.) used in the flux testing of samples of sheets of hydrophilic microporous polyethylene and asymmetric composite membrane.

Initial flux rates under pressure (20 bar) and no pressure were determined using the Sterlitech flux rig illustrated in FIG. 13 equipped with a PolyScience cooling unit. The samples were mounted in the flux cell and bolted. Deionized water was fed into the rig at 2.5 L min$^{-1}$ and 4 to 8° C. The time to collect a predetermined volume of permeate was noted. The flux rate (J) was calculated according to the following equation:

TABLE 1

Structure of AMPS, SSS and alternative hydrophilicitizing agents.

| Hydrophilicitizing agents | Structure |
|---|---|
| 2-acrylamido-1-methyl-2-propanesulfonic acid (AMPS) | |
| 2-propen-1-ol (allyl alcohol) | |
| 2-propenoic acid (acrylic acid) | |
| 2-hydroxyethyl 2-methyl-2-propenoic acid ester (HEMA) | |
| 4-ethenyl-benzenesulfonic acid (as the sodium salt) (SSS) | |

Characterisation of Hydrophilic Microporous Polyolefin Samples

Fourier Transform Infrared (FTIR)

Spectra of the samples were recorded using a Thermo Electron Nicolet 8700 FTIR spectrometer equipped with a single bounce ATR and diamond crystal. An average of 32 scans with a 4 cm$^{-1}$ resolution was taken for all samples.

Surface Analysis

The contact angles for the surfaces of the asymmetric composite membrane were determined in using the captive $$J = \frac{V}{t \times A}$$

where V is the permeate volume (L), t is the time (h) for the collection of V and A is area of the sample (m$^2$) which was determined to be 0.014 m$^2$.

To assess durability in different environments tests were also performed on samples immersed for 60 to 70 hours in aqueous solutions of either 30% (w/v) potassium hydroxide ("alkali environment") or 33% (w/v) hydrochloric acid ("acid environment").

Dry weight increases were calculated by taking the dry weight of the sample after it had dried in an oven for half an hour and comparing the weight to the initial weight of the porous polyethylene before grafting. Dry weights were taken after loose polymer had been extracted from the membrane and at the end of testing after a clean in place.

$$\Delta m_{dry} = \frac{m_{dry} - m_{initial}}{m_{initial}} \times 100$$

Water absorption was measured after loose polymer from the membrane had been extracted. The wet membranes were dabbed dry with a paper towel to remove surface moisture and weighed.

$$\Delta m_{Wet} = \frac{m_{wet} - m_{initial}}{m_{initial}} \times 100$$

Total solids rejection for whole milk samples was measured by pouring 20 mL of sample from the feed in a petri dish and measuring the dry weight after 2 hours in a 100° C. oven.

$$\% R_{TS} = \left(1 - \frac{m_{p,TS}}{m_{f,TS}}\right) \times 100$$

where $m_{p,TS}$ is total milk solids in the permeate and $m_{f,TS}$ is the mass of milk total solids in the feed.

Sodium chloride rejection was measured using a 2 g/L solution with a feed pressure of 16 bar. The conductivities from the feed and permeate were compared.

$$\% R_{NaCl} = \left(1 - \frac{\sigma_p}{\sigma_f}\right) \times 100$$

Where $\sigma_p$ is the conductivity of permeate and $\sigma_f$ is the conductivity of the feed.

The bubble point of the dry membranes was determined by gradually increasing the pressure of the feed until permeate started to flow through the membrane.

Results

The FTIR spectra for samples A to D generally showed faint peaks compared to the peaks observed in the FTIR spectrum of the unmodified polyolefin substrate (CELGARD™ K2045, Celgard LLC)(see FIG. 1). However, the ester and carbonyl groups of Sample C were clearly discernible. The hydroxyl group peaks of Sample A and Sample D were barely evident. The FTIR spectrum for Sample B was not determined.

Figure 2:
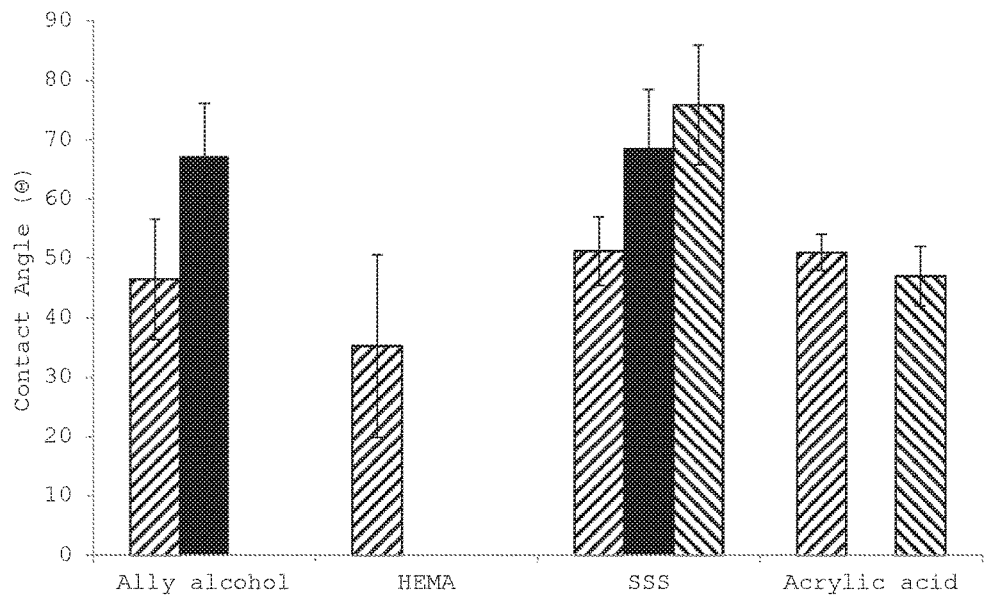
FIG. 2. Comparison of the contact angles determined for Sample 1 (Ally [sic] alcohol), Sample 3 (HEMA), Sample 4 (SSS) and Sample 2 (Acrylic acid) before (◪) and after exposure to an acid (◣) or alkali (■) environment.
Figure 3:
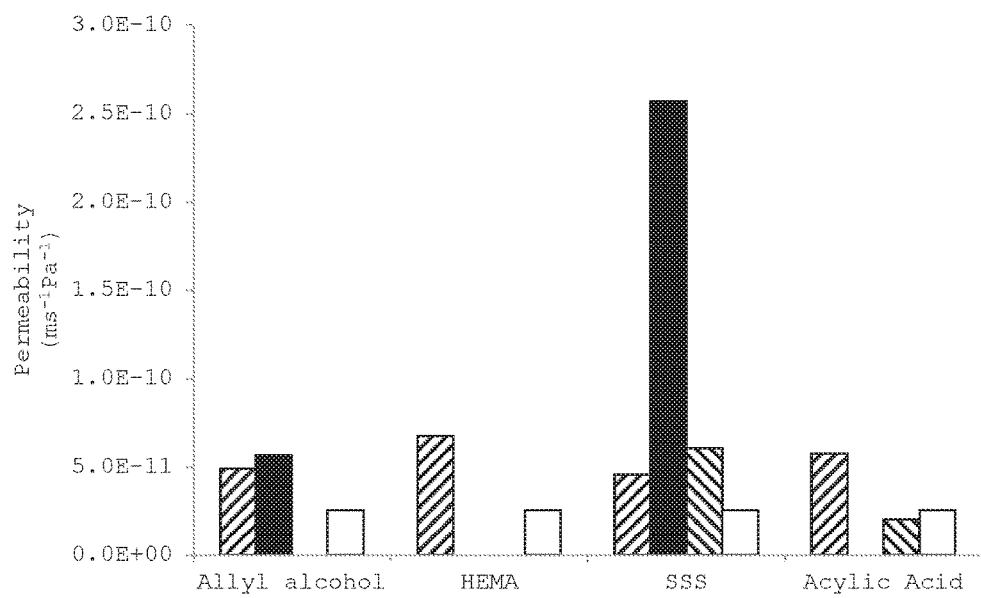
FIG. 3. Comparison of the permeability determined for Sample 1 (Allyl alcohol), Sample 3 (HEMA), Sample 4 (SSS) and Sample 2 (Acylic [sic] Acid) before (◪) and after exposure to an acid (◣) or an alkali (■) environment relative to the permeability of the unmodified polyolefin substrate (□).
Figure 4:
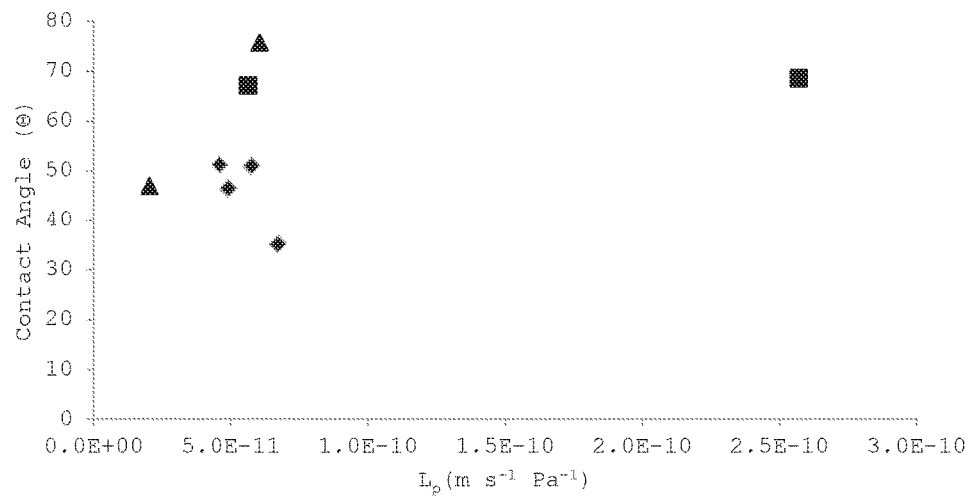
FIG. 4. Correspondence between contact angle and permeability determined for samples before (♦) and after exposure to an acid (▲) or an alkali (■) environment. The outlier is Sample 4 (SSS) after exposure to an alkali (■) environment.

The contact angles for samples A to D showed an inverse relationship with the permeability determined for the same sample (see FIGS. 2 to 4). Sample C was observed to have the lowest contact angle and the highest permeability prior to exposure to an acid or alkali environment. Following exposure to an acid environment the contact angle for Sample D increased. The contact angle of the unmodified polyolefin substrate (CELGARD™ K2045, Celgard LLC) was determined to be 89°, so modification of the surface tension is shown for all the samples despite the absence of definitive FTIR spectra. The observed initial flux rates were also consistent with modification of the polyolefin substrate (see Table 2).

TABLE 2

Initial flux rates of samples of modified polyolefin substrate (CELGARD ™ K2045, Celgard LLC).

| | Initial flux (Lm²min⁻¹) | |
|---|---|---|
| Sample | No pressure | Pressure (20 bar) |
| A (Allyl alcohol) | 50 | 484 |
| B (Acrylic acid) | 43 | 555 |
| C (HEMA) | 61 | 772 |
| D (SSS) | 44 | 577 |

All of samples A to D showed an increase in permeability compared to the unmodified membrane which measured 2.56 m s⁻¹ Pa⁻¹. When soaked for 66 hours in 30% (w/v) potassium hydroxide Sample A was stable based on a comparison of the permeability determined before and after exposure to the alkali environment. By comparison Sample D showed a large increase in permeability when exposed to the same alkali environment indicating the importance of the selection of the hydrophilicitizing agent when preparing modified polyolefin substrates for particular applications, e.g. alkaline battery separators. Furthermore, when immersed in 33% (w/v) hydrochloric acid Sample D turned the acid environment yellow and a strong odour of chlorine was detected, indicating oxidation of the modified polyolefin substrate. Notwithstanding this observation, the permeability of Sample D following exposure to the acid environment remained stable suggesting that the polyolefin substrate was not being degraded. When Sample B was exposed to the acid environment no colour change was observed, but the permeability decreased to less than the permeability of the polyolefin substrate, i.e. less than 2.56 m s⁻¹ Pa⁻¹).

Figure 5:
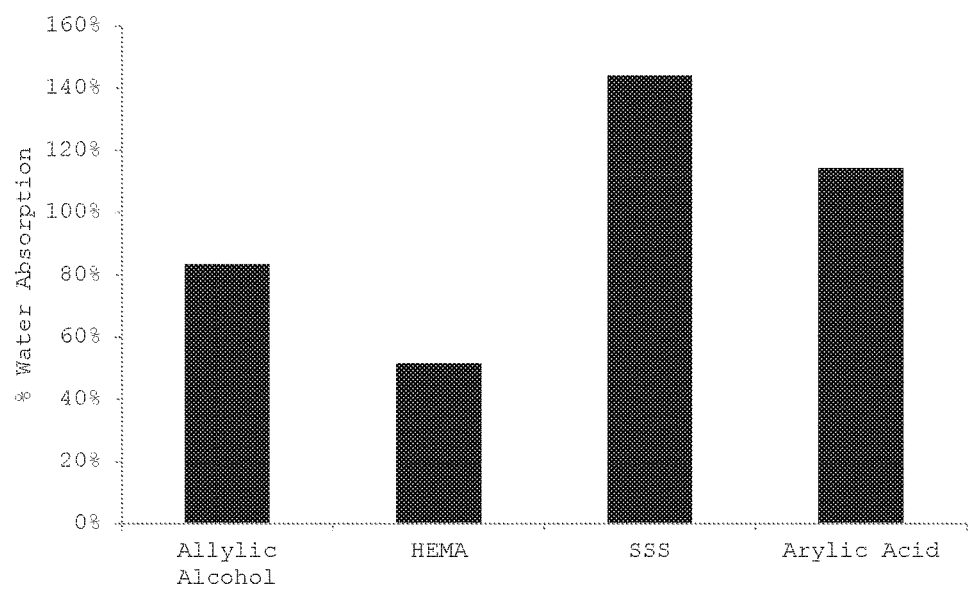
FIG. 5. Water absorption determined for Sample 1 (Allylic alcohol), Sample 2 (Arylic [sic] Acid), Sample 3 (HEMA) and Sample 4 (SSS).
Figure 6:
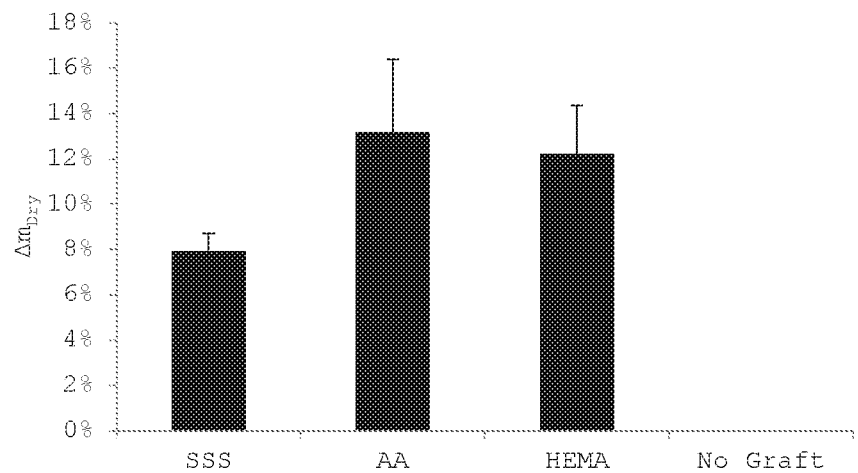
FIG. 6. The dry weight increase determined for Sample 5 (SSS), Sample 6 (AA), Sample 7 (HEMA) and the untreated microporous polyethylene substrate (CELGARD™ K2045).
Figure 7:
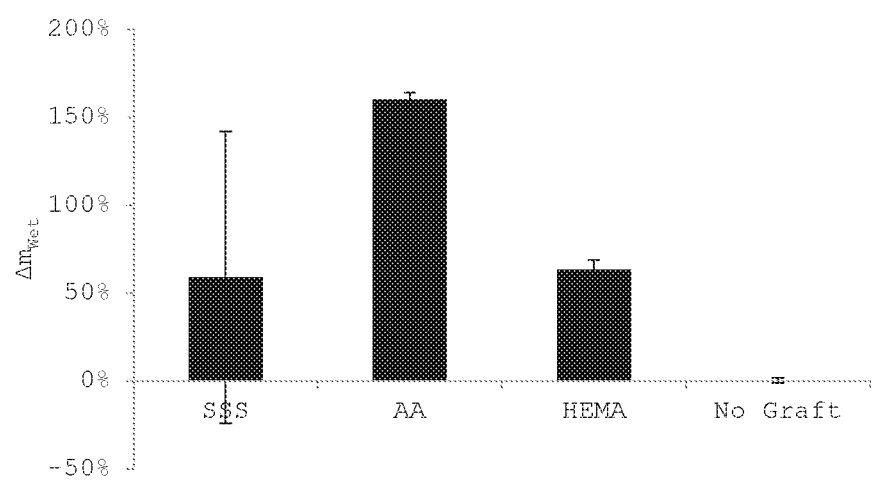
FIG. 7. The water absorption determined for Sample 5 (SSS), Sample 6 (AA), Sample 7 (HEMA) and the untreated microporous polyethylene substrate (CELGARD™ K2045).
Figure 8:
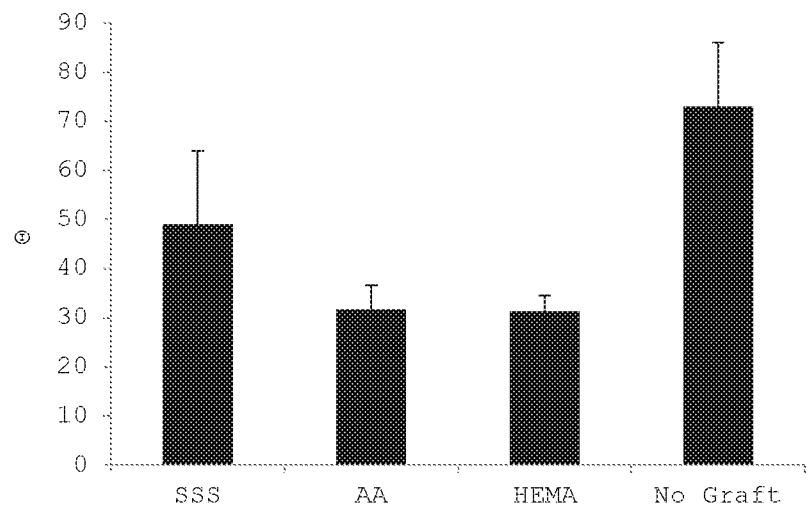
FIG. 8. The contact angles determined for Sample 5 (SSS), Sample 6 (AA), Sample 7 (HEMA) and the untreated microporous polyethylene substrate (CELGARD™ K2045).
Figure 9:
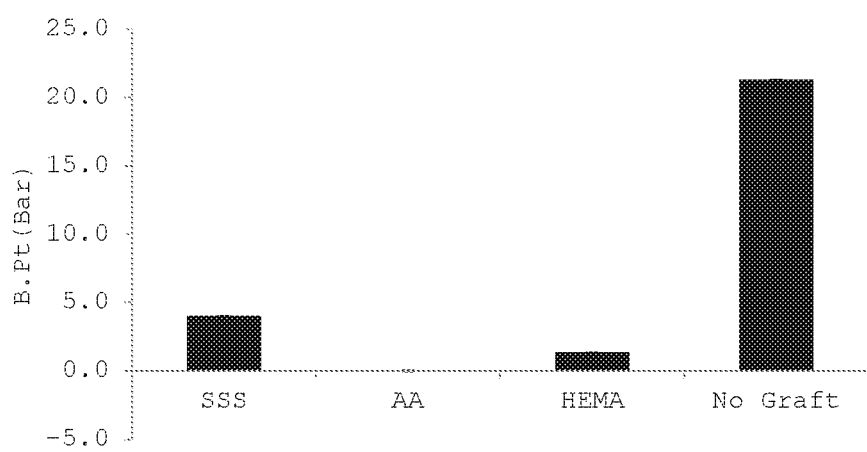
FIG. 9. The bubble points determined for Sample 5 (SSS), Sample 6 (AA), Sample 7 (HEMA) and the untreated microporous polyethylene substrate (CELGARD™ K2045).
Figure 10:
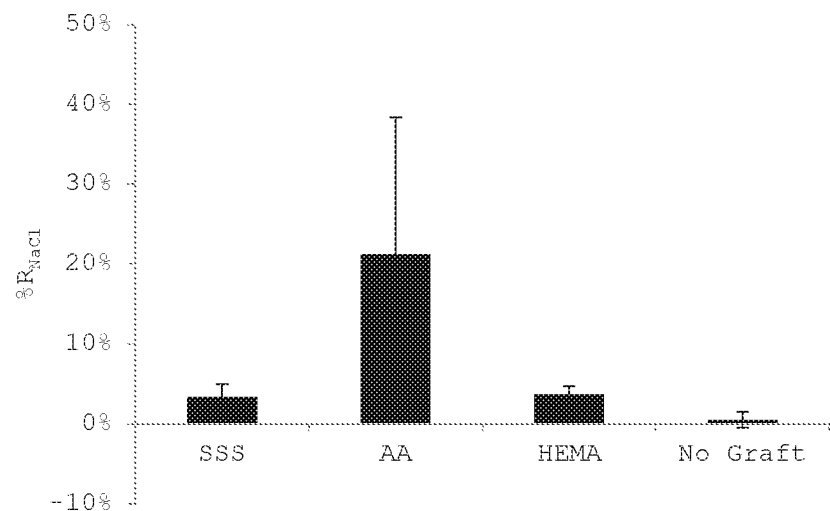
FIG. 10. The sodium rejection determined for Sample 5 (SSS), Sample 6 (AA), Sample 7 (HEMA) and the untreated microporous polyethylene substrate (CELGARD™ K2045).
Figure 11:
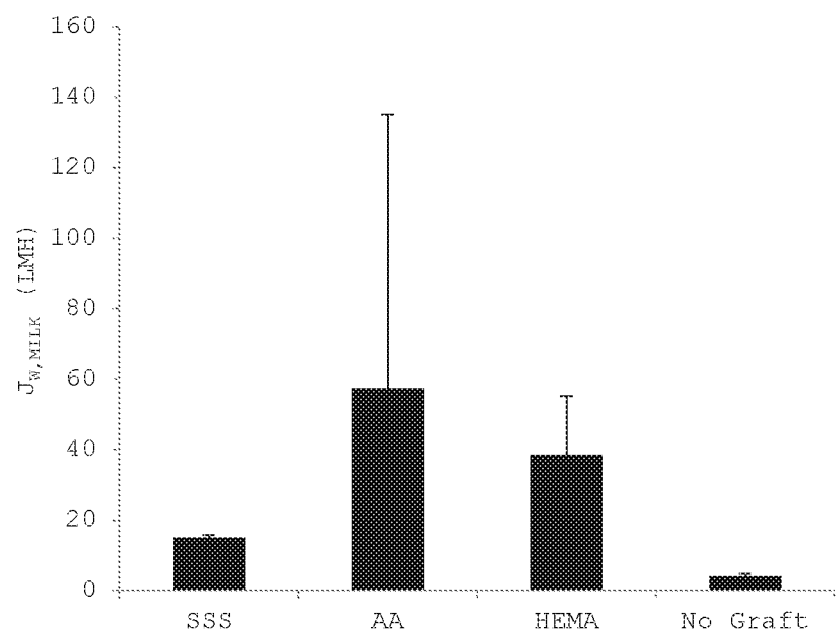
FIG. 11. The milk flux determined for Sample 5 (SSS), Sample 6 (AA), Sample 7 (HEMA) and the untreated microporous polyethylene substrate (CELGARD™ K2045).

As a general rule the higher the observed contact angle the lower the permeability determined for a sample. After Sample D was exposed to an alkali environment the sample developed a high initial flux even though the contact angle was determined to remain high. This observation indicates that the structure of the modified polyolefin is degraded. Water absorption was observed to be greatest for Sample B and Sample D, and of these two samples, Sample D had the largest water absorption. Sample A had a larger water absorption than Sample C (see FIG. 5).

Based on the assessment the preparation of modified polyolefin substrates according to the general method using 2-hydroxyethyl 2-methyl-2-propenoic acid ester as the hydrophilicitizing agent is selected for use as a backing or support layer in osmosis membranes. Sample C has been determined to provide high initial flux and the ability to let permeate through at low pressure differentials. Use of this class of modified polyolefin is indicated for medical applications.

Based on the assessment the preparation of modified polyolefin substrates according to the general method using 2-propen-1-ol as the hydrophilicitizing agent is selected for use in applications having an alkali environment. Sample A maintained a relatively high permeability under these conditions.

Based on the assessment the preparation of modified polyolefin substrates according to the general method using 4-ethenyl-benzenesulfonic acid as the hydrophilicitizing agent is selected for use in applications having an acid environment. Under these conditions Sample D maintained a more stable flux than Sample B exposed to the same conditions.

The assessments of replicates (i, ii, iii, . . . ) of samples E, F and G are presented in Table 3 and FIGS. 6 to 12.

TABLE 3

Assessments of replicates of Samples E, F and G.

| Hydro-philicitizing agent | Sample (replicate) | $\Delta m_{dry}$ | $\Delta m_{wet}$ | B.Pt bar | B. $Pt_{CIP\,1}$ | $\Theta$ | $Flux_{DI}$ | % $R_{NaCl}$ | $Flux_{Milk}$ ($Lm^{-2}hr^{-1}$) | % $R_{TS}$ |
|---|---|---|---|---|---|---|---|---|---|---|
| 4-ethyenyl-benzenesulfonic acid, Na salt (SSS) | E (i) | 9% | 10% | 4 | 0 | 32 | 429 | 2% | 16 | 66% |
| | E (ii) | 7% | 13% | 4 | 4 | 60 | 114 | 3% | 15 | 71% |
| | E (iii) | 7% | 155% | 4 | 0 | 55 | 213 | 5% | 15 | 65% |
| Acrylic acid (AA) | F (i) | 10% | 158% | 0 | 0 | 33 | 208 | 9% | 13 | 72% |
| | F (ii) | 13% | 165% | 0 | 0 | 32 | 167 | 13% | 147 | 8% |
| | F (iii) | 16% | 158% | 0 | 0 | 30 | 208 | 41% | 12 | 71% |
| 2-hydroxyethyl 2-methyl-2-propenoic acid ester (HEMA) | G (i) | 13% | 64% | 0 | 0 | 32 | 303 | 4% | 20 | 50% |
| | G (ii) | 14% | 57% | 0 | 0 | 35 | 405 | 3% | 44 | 46% |
| | G (iii) | 10% | 68% | 4 | 4 | 27 | 147 | 4% | 51 | 46% |
| | G (iv) | 10% | 68% | 0 | 0 | 31 | 385 | 2% | 97 | 16% |

Figure 12:
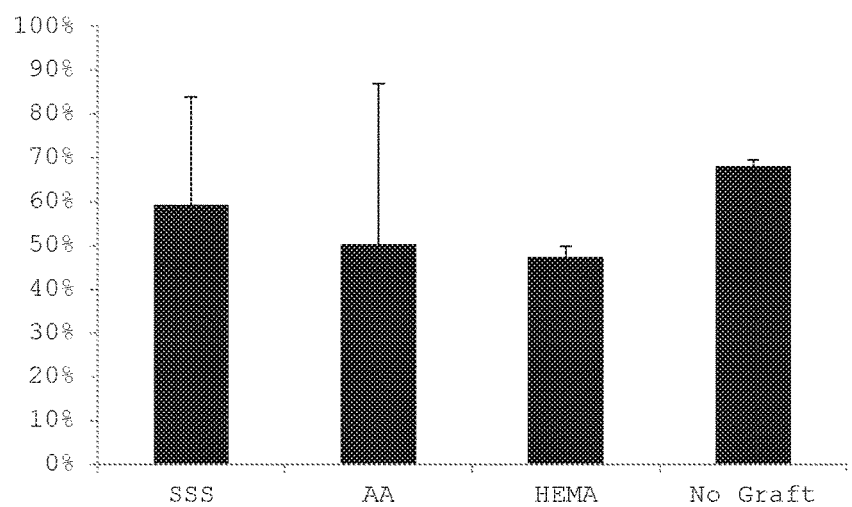
FIG. 12. The total milk solids rejection determined for Sample 5 (SSS), Sample 6 (AA), Sample 7 (HEMA) and the untreated microporous polyethylene substrate (CELGARD™ K2045).

Sample F was observed to provide a water permeable membrane with the highest rejection of salt (sodium chloride) (FIG. 10) combined with a relatively high flux (FIG. 11) and rejection of total milk solids (FIG. 12). Based on this assessment the preparation of modified polyolefin substrates according to the general method using acrylic acid as the hydrophilicitizing agent is indicated for use as a membrane in the ultrafiltration of feed streams such as milk.

The combination of a cross-linked poly(ether ether ketone) rejection layer and a hydrophilic microporous polyethylene backing layer provides a durable asymmetric composite membrane suitable for use in commercial processing operations.

Preparation of the Asymmetric Composite Membrane

The membrane is prepared by adhering a sheet of hydrophilic microporous poly(ethylene) (µPE) to a film of putatively cross-linked sulfonated poly(ether ether ketone) (sPEEK). The adherence is augmented by the interpenetration of the two polymers. In the laboratory the membrane may be prepared according to the following method in which the sheet of hydrophilic µPE is nominally referred to as the 'backing layer' and the film of putatively cross-linked sPEEK is nominally referred to as the 'rejection layer'. (The backing layer may alternatively be referred to as the 'support layer' and the rejection layer alternatively referred to as the 'barrier layer'.) The method provides the advantage of being adaptable to the continuous production of the asymmetric composite membrane. The method is described in detail in respect of the preparation of a single sample.

Rejection Layer

Poly(ether ether ketone) (PEEK) (VICTREX™ 450P, Victrex, England) was sulfonated by heating to 70° C. in concentrated sulfuric acid (95%) for 8 hours. The sulfonated PEEK (sPEEK) was precipitated and washed in ice water several times before being dried in a vacuum oven. Without wishing to be bound by theory it is believed the small amount of water present in the concentrated sulfuric acid prevents cross-linking attributable to the formation of sulfone bridges. The degree of sulfonation of the sPEEK was determined by titration according to a modified form of the method disclosed in the publication of Drioli et al (2004). The sPEEK was leached for three days in a 3M solution of sodium chloride (NaCl) and the resulting solution titrated against a 0.2 M solution of sodium hydroxide (NaOH) using phenolphthalein as indicator. An amount of sPEEK (0.2 g) with a 69% DS was then added to a volume of dimethylacetamide (DMAc) (2.7 mL) and sonicated until a clear to slightly cloudy dispersion was obtained.

A volume (0.1 mL) of divinylbenzene (DVB) as cross-linking agent and an amount (0.14 g) of sodium styrene sulfonate (SSS) as hydrophilicitizing agent were added to a dispersion of sPEEK in DMAc. The dispersion contained 8% (w/w) sPEEK (0.216 mol/L) to provide a mixture containing a molar ratio of DVB to sPEEK of 1:2 and a molar ratio of SSS to sPEEK of 1:2. To increase the rate of the photoinitiated reaction an amount of benzophenone (BP) (8 µg) was added to the mixture before pouring onto aluminium foil on a glass plate, directly onto a glass plate or directly onto a stainless steel surface. The poured mixture was then exposed to 0.1 mW m$^{-1}$ UVA fluorescent lamps (368 nm) at a distance of 50 mm for a limited time of 60 to 90 seconds to provide a semi-cured film. The photoinitiated reaction is conveniently performed under an atmosphere of air (without the need to provide an inert, e.g. nitrogen (N$_2$), atmosphere). The structures of DVB and alternative di- and tetra-ethenyl cross-linking agents are provided in Table 4.

TABLE 4

Structures of cross-linking agents.

| Cross-linking agents | Structure |
|---|---|
| o-Divinylbenzene (o-DVB) | |
| m-Divinylbenzene (m-DVB) | |
| p-Divinylbenzene (p-DVB) | |
| Ethylene glycol dimethacrylate (EGDMA) | |

TABLE 4-continued

Structures of cross-linking agents.

| Cross-linking agents | Structure |
|---|---|
| glyoxal bis (diallyl acetal) (GBDA) | |

Backing Layer

The sheet of sµPE to which a film of xsPEEK is adhered was prepared from a preformed sheet of microporous poly(ethylene)(µPE). The formation of sheets µPE is described, for example, in the publications of Fisher et al (1991) and Gillberg-LaForce (1994). In the present studies a preformed sheet of µPE (20 µm thickness, 45% porosity, 0.08 µm average pore diameter) (CELGARD™ K2045, Celgard LLC) was contacted with a solution of 1% (w/v) benzophenone and 6% (w/v) 4-ethenyl-benzenesulfonic acid (as the sodium salt) (SSS) as hydrophilicitizing agent in 1:1 (v/v) acetone-water. The solution was prepared by mixing benzophenone with acetone before adding water and then the hydrophilicitizing agent. The use of SSS is preferred due to the greater chlorine tolerance of membranes prepared using this hydrophilicitizing agent. This advantage applies to both the preparation of the hydrophilicitized backing layer and the asymmetric composite membrane.

Asymmetric Composite Membrane

The sheet of µPE contacted with the solution was laid on top of the semi-cured film (the nascent 'rejection layer'). The composite of µPE contacted with the solution and semi-cured film of putative xsPEEK was then exposed as before to 0.1 mW mil UVA fluorescent lamps (368 nm) at a distance of 50 mm, but for a limited time of 210 seconds. The UVA-irradiated composite was then dried in an oven at 60° C. for 30 minutes to promote adherence of the film and sheet before releasing the composite membrane from the aluminium foil by immersion in a solution of 2% w/w sodium hydroxide or, if cured on a glass plate, by immersing the membrane in a water bath at room temperature until the membrane releases and floats to the surface (typically for 10 to 15 minutes). Where the nascent rejection layer is cured on a stainless steel surface it may be necessary to soak in water overnight. The structures of AMPS, SSS and alternative mono-ethenyl hydrophilicitizing agents are provided in Table 1. Before evaluation the laboratory prepared composite membrane was rinsed at 50° C. with a large excess of deionised (DI) water.

Samples of the asymmetric composite membrane were prepared according to the foregoing method consisting of a rejection layer and a backing layer prepared using the compositions and conditions provided in Table 3 and Table 4.

TABLE 5

Rejection layer formulations and cure conditions used in the preparation of each of the samples. The rejection layer of sample 12 was prepared using 1:1 (v/v) acetone-water as solvent.

| Sample | DS | sPEEK | DVB | SSS | BP | Solvent | % solids (w/w) | Cure time (s) | Number of applications |
|---|---|---|---|---|---|---|---|---|---|
| | | % of solids | | | | | | | |
| 1 | 69 | 45 | 22 | 31 | 2 | DMAc | 12 | 90 | 1 |
| 2 | 69 | 45 | 22 | 31 | 2 | DMAc | 12 | 60 | 1 |
| 3 | 69 | 45 | 15 | 33 | 6 | DMAc | 15 | 90 | 2 |
| 4 | >80 | 41 | 17 | 30 | 11 | DMAc | 15 | 90 | 1 |
| 5 | 69 | 45 | 15 | 33 | 6 | DMAc | 15 | 90 | 2 |
| 6 | 69 | 98 | 0 | 0 | 2 | DMAc | 15 | 90 | 1 |
| 7 | 69 | 70 | 21 | 0 | 9 | DMAc | 9 | 90 | 1 |
| 8 | 69 | 57 | 35 | 0 | 8 | DMAc | 9 | 90 | 1 |
| 9 | 69 | 47 | 46 | 0 | 6 | DMAc | 9 | 90 | 1 |
| 10 | 69 | 42 | 52 | 0 | 6 | DMAc | 9 | 90 | 1 |
| 11 | >80 | 63 | 32 | 0 | 5 | MeOH | 29 | 90 | 1 |
| 12 | >80 | 15 | 10 | 70 | 5 | acetone/water | 6 | 300 | 1 |
| 13 | 69 | 45 | 19 | 34 | 2 | DMAc | 15 | 90 | 2 |

TABLE 6

Backing layer formulations used in the preparations of each of the samples. All backing layers (except for sample 11 and sample 12) were prepared using 1:1 (v/v) acetone-water as solvent.

| Sample | Hydro-philicitizing agent (H.A.) | H.A. % of solids | BP | % solids (w/w) | Cure time (s) | Number of applications |
|---|---|---|---|---|---|---|
| 1 | AMPS | 86 | 14 | 7 | 90 | 1 |
| 2 | AMPS | 86 | 14 | 7 | 600 | 2 |
| 3 | SSS | 86 | 14 | 7 | 90 | 1 |
| 4 | SSS | 86 | 14 | 7 | 90 | 1 |
| 5 | SSS | 86 | 14 | 7 | 90 | 1 |
| 6 | SSS | 86 | 14 | 7 | 90 | 1 |
| 7 | SSS | 86 | 14 | 7 | 90 | 1 |
| 8 | SSS | 86 | 14 | 7 | 90 | 1 |
| 9 | SSS | 86 | 14 | 7 | 90 | 1 |
| 10 | SSS | 86 | 14 | 7 | 90 | 1 |
| 11 | n.a. | n.a. | n.a. | n.a. | n.a. | n.a. |
| 12 | n.a. | n.a. | n.a. | n.a. | n.a. | n.a. |
| 13 | SSS | 86 | 14 | 7 | 90 | 1 |

Characterisation of the Asymmetric Composite Membrane

The performance of the asymmetric composite membrane was evaluated using a reverse osmosis (RO) filter assembly of the type illustrated in FIG. 13. A section of the asymmetric composite membrane (1) was pre-wetted by dipping in distilled water and then placed on a coarse support mesh (2) located in the lower half (3) of the filter assembly housing, with a shim (4) optionally interposed. The section was placed with the rejection layer of the asymmetric composite membrane facing downwards. A fine mesh (5) located in the upper half of the filter assembly (6) housing was placed over the upper surface of the section of the asymmetric composite membrane (1). The filter assembly was sealed by sealing rings (7, 8) and held in a hydraulic press pressurised to 60 Bar. The inlet port (9) of the lower half of the filter assembly housing (3) was in fluid connection with a feed reservoir (not shown) from which a feed stream was pumped (425 rpm) at a rate to maintain the feed stream pressure measured on the pressure gauge (10). Permeate was collected from the outlet port (11) of the upper half of the filter assembly housing (6) in a graduated cylinder (not shown). Collection was started at least 5 minutes after the commencement of permeate being discharged from the outlet port (11) in order to exclude water from the pre-wetting of the membrane or permeate from previously used feed streams. Flow rates of approximately 2 L/min were obtained.

Permeability was determined by measuring the flux in deionized water at various pressures starting at 20 bar and decreasing in 4 bar iterations. Flux $J_V$ was then graphed against effective pressure difference across the membrane, $p_{eff}$, and the slope of the permeability $L_p$.

$$L_p = \frac{J_V}{\Delta p_{eff}}$$

Initial flux rates under pressure (20 bar) and no pressure were determined. The asymmetric composite membrane was mounted in the flux cell and bolted. Deionized water was fed into the rig at 2.5 L min$^{-2}$ and 4 to 8° C. The time to collect a predetermined volume of permeate was noted. The flux rate (J) was calculated according to the following equation:

$$J = \frac{V}{t \times A}$$

where V is the permeate volume (L), t is the time (h) for the collection of V and A is area of the sample (m$^2$) which was determined to be 0.014 m$^2$.

To mimic commercial processing operations the asymmetric composite membrane was subjected to 'clean-in-place' (CIP) protocols between each use of milk as the feed stream. The CIP protocols were based on those employed in a commercial processing operation for reverse osmosis (RO) membranes (Anon (2014)) and summarised in Table 7. The CIP protocols were repeated alternating with the use of milk as a feed stream. Samples were taken from the feed and permeate for each intervening use of milk as a feed stream to determine any deterioration in the performance of the membrane attributable to repeated CIP protocols. The asymmetric composite membrane was also evaluated for its tolerance to a CIP protocol including sodium hypochlorite (Table 8).

TABLE 7

Clean-in-place (CIP) protocol adapted from Anon (2014).

| Step | Wash[1] | Time (min) | Temperature (° C.) |
|---|---|---|---|
| 1 | Water | 5 | Ambient |
| 2 | Water | 5 | 35 |
| 3 | Alkali | 10 | 35 |
| 4 | Water | 5 | 35 |
| 5 | Acid | 10 | 35 |
| 6 | Water | 5 | Ambient |
| 7 | Alkali | 10 | 35 |
| 8 | Water | 5 | Ambient |

[1]alkali (2% (w/v) NaOH) and acid (1.9% (w/v) H$_2$NO$_3$ and 0.6 (w/v) H$_3$PO$_4$).

TABLE 8

Clean-in-place (CIP) protocol including 200 ppm free chlorine (as sodium hypochlorite).

| Step | Wash[1] | Time (min) | Temperature (° C.) |
|---|---|---|---|
| 1 | Water | 5 | Ambient |
| 2 | Water | 5 | 35 |
| 3 | Alkali | 10 | 35 |
| 4 | Water | 5 | 35 |
| 5 | Acid | 10 | 35 |
| 6 | Water | 5 | Ambient |
| 7 | Chlorine | 10 | 35 |
| 8 | Water | 5 | 35 |
| 9 | Water | 1-2 | 35 |
| 10 | Water | 1-2 | Ambient |

[1]alkali (2% (w/v) NaOH), acid (1.9% (w/v) H$_2$NO$_3$ and 0.6 (w/v) H$_3$PO$_4$) and chlorine (0.05% (w/v) sodium hydroxide and 0.09% (w/v) sodium hypochlorite).

The following measurements relating to the performance of the asymmetric composite membrane before and after repeated application of the CIP protocols were made:

1. initial flux rates with water or whole milk as the feed stream after equilibration for 30 minutes;
2. rejection levels for fat, lactose and protein;
3. total solids content;
4. salt (NaCl or Na2SO4) retention; and
5. Sucrose retention.

The total solids content was determined gravimetrically for both the feed and permeate. Samples were weighed in Petri dishes and dried in an oven at 60° C. for two hours and then 102° C. for a further two hours. The results are summarised in Table 9.

Comparative Studies

Sample 1

Figure 14:
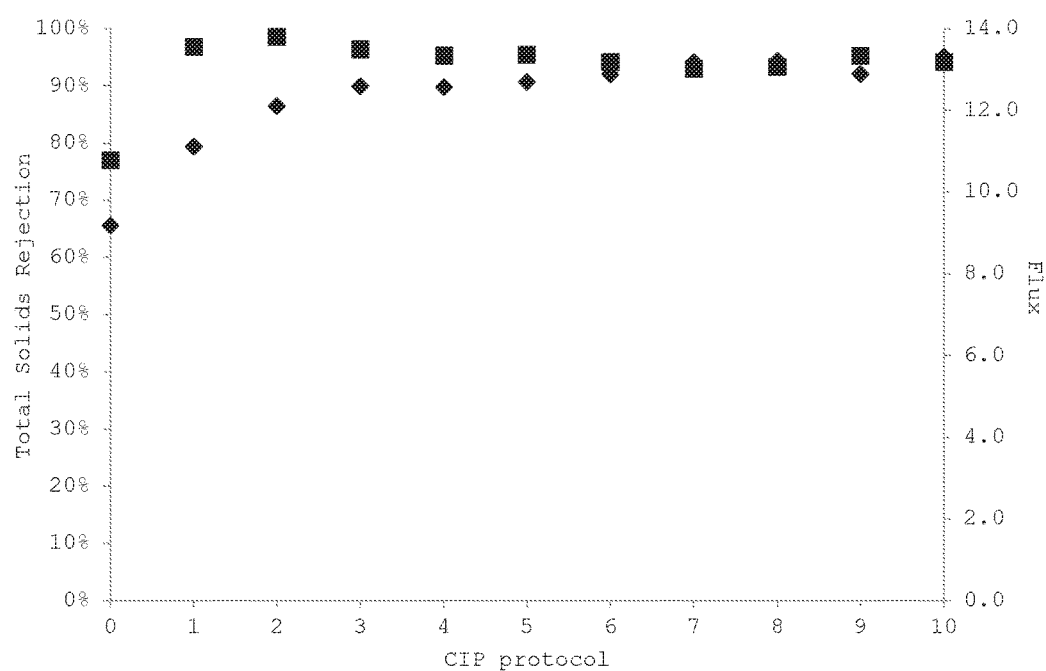
FIG. 14. Flux (LMH) (♦) and total solids rejection (%) (■) for Sample 1 during repeated CIP protocols (10× according to the schedule provided in Table 8). The feed stream was whole milk.

The sample was subjected to repeated CIP protocols according to the schedule provided in Table 8 with the exception that Step 1 and Step 6 were also performed at 35° C. The maximum total solids rejection (standard milk) was observed after three CIP protocols with flux and total solids rejection stabilising after four to five CIP protocols (FIG. 14). Microscopic examination of the surface of the sample exposed to repeated CIP protocols indicated an increase in crystallinity of the membrane. It was found that increasing the concentration of the photoinitiator benzophenone (BP) used in the subsequent preparation of samples improved the reproduceability of these observations.

TABLE 9

Performance of the samples of the asymmetric composite membrane measured at 20 bar.

| Sample | Deionised water Flux L/m²/h (gfd) | Rejection (NaCl) | Standard milk Rejection (lactose) | Rejection (total solids) | Flux L/m²/h (gfd) |
|---|---|---|---|---|---|
| 1 | 40 (11.7) | 52 | 99 | 99 | 12.1 (3.5) |
| 2 | 18.1 (5.3) | 47 | 98 | 99 | 10.1 (3.0) |
| 3 | 9.5 (2.8) | 46 | 90 | 97 | 9.4 (2.8) |
| 4 | 50 (14.7) | 64 | 75 | 97 | 14.7 (4.3) |
| 5 | 9.5 (2.8) | 46 | 91 | | 6 (1.8) |
| 6 | 1051 (308) | | | 82 | 13.5 (4.0) |
| 7 | 3.3 (1.0) | 19 | 42 | 73 | 8.7 (2.6) |
| 8 | 56 (16) | 17 | 91 | 83 | 12.4 (3.6) |
| 9 | 65 (19) | 13 | 59 | 79 | 14 (4.1) |
| 10 | 107 (31) | 5 | 32 | 71 | 12.7 (3.7) |
| 11 | 1.6 (0.5) | 50 | n.a. | n.a. | n.a. |
| 12 | 83 (24) | 25 | | | |
| 13 | 100 (29) | 38 | | | |

Sample 2

Figure 15:
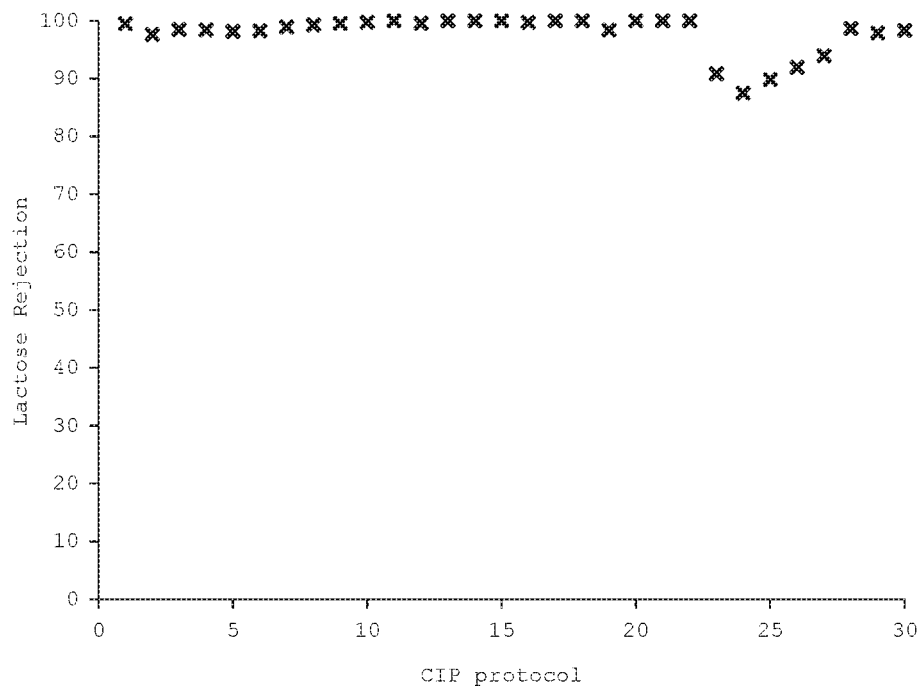
FIG. 15. Lactose rejection (%) detected by FTIR for Sample 2 during sequential CIP protocols (10 times according to the schedule provided in Table 7 followed by 12 times according to the schedule provided in Table 8), drying of the sample and further CIP protocols (8 times according to the schedule provided in Table 8). The feed stream was whole milk.

The sample was subjected to repeated sequential CIP protocols according to the schedules provided in Table 7 (10×) and Table 8 (12×). The sample was then dried for several days before being subjected to further CIP protocols. The lactose rejection remained high throughout the sequential CIP protocols, the moderate decline in performance being recoverable following drying of the sample (FIG. 15).

Sample 3

Figure 16:
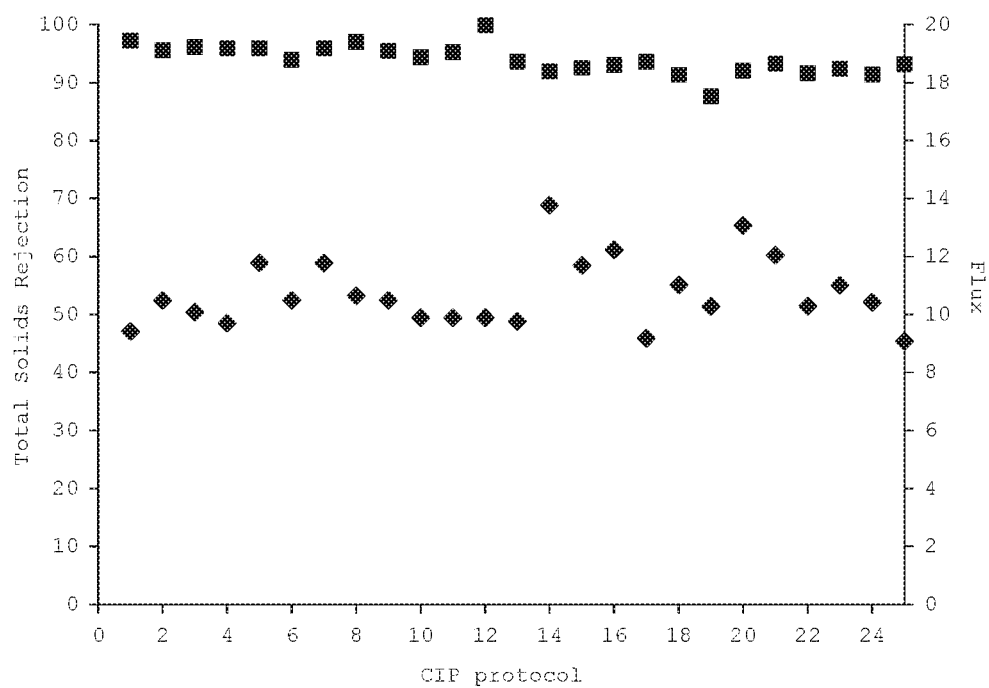
FIG. 16. Flux (LMH) (♦) and total solids rejection (%) (■) for Sample 3 during repeated CIP protocols (25× according to the Schedule provided in Table 8. The feed stream was whole milk.

The sample was subjected to repeated CIP protocols (25×) according to the schedule provided in Table 8. A total solids rejection (standard milk) comparable with that obtained for sample 1 was observed. A greater variability in flux was observed (FIG. 16).

Sample 4

Figure 17:
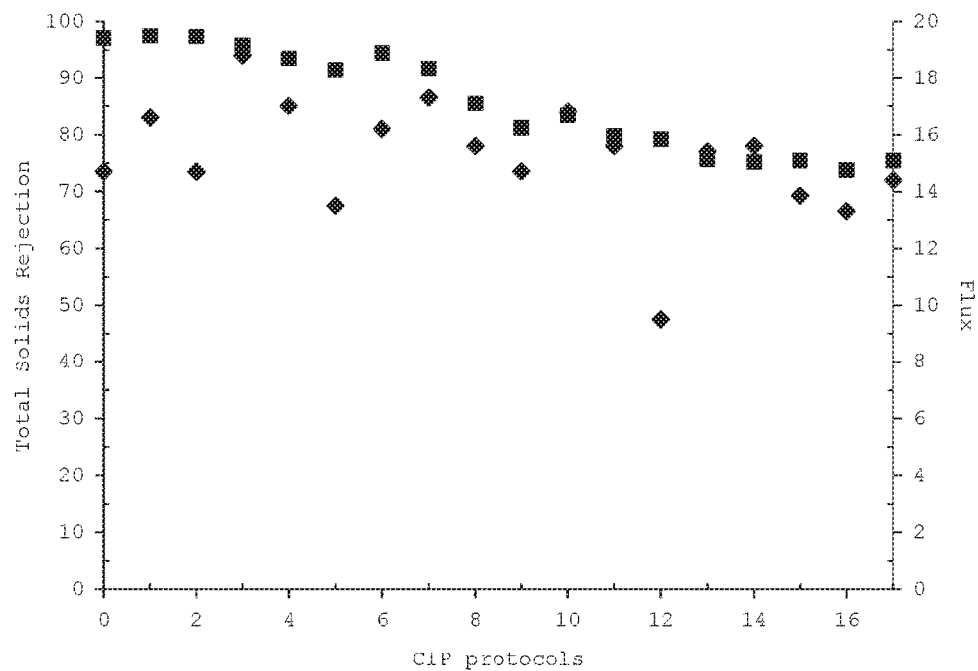
FIG. 17. Flux (LMH) (♦) and total solids rejection (%) (■) for Sample 4 during repeated CIP protocols (17 times according to the schedule provided in Table 8). The feed stream was whole milk.
Figure 18:
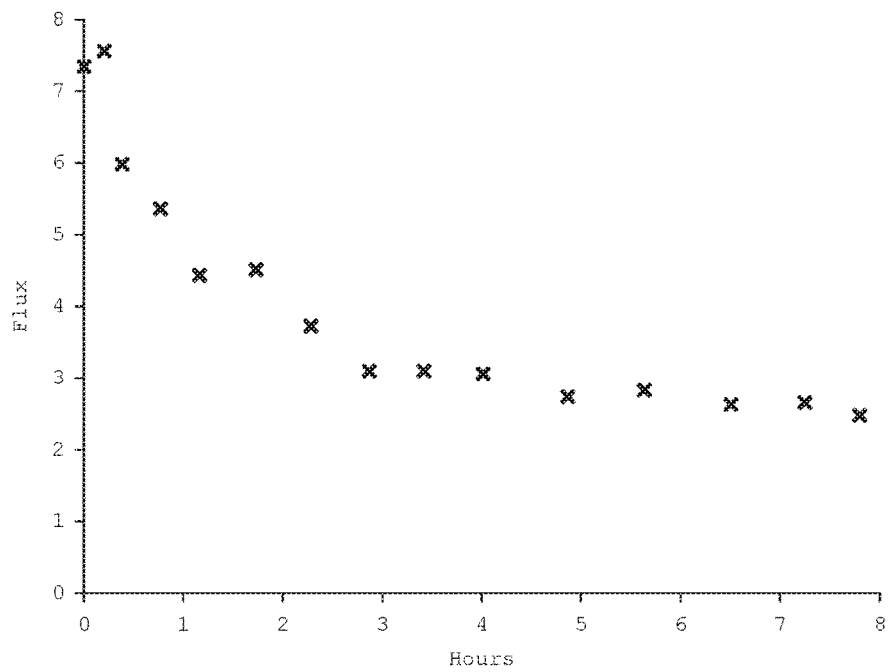
FIG. 18. Flux (LMH) (X) for Sample 5 measured over a period of eight hours using raw milk as the feed stream.
Figure 19:
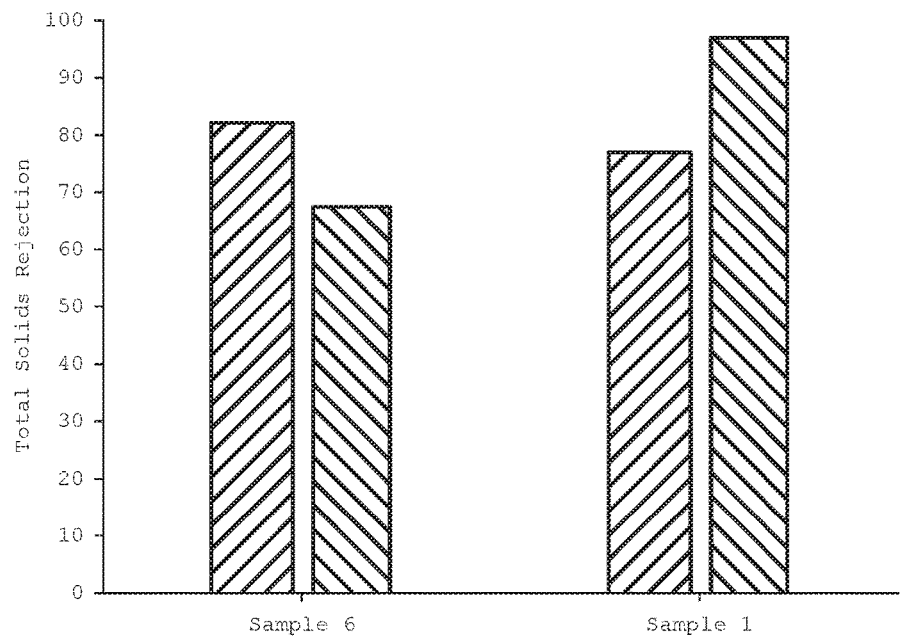
FIG. 19. Comparison of the total solids rejection (%) for Sample 6 and Sample 1 before (left hand bar) and after (right hand bar) a single CIP protocol according to the schedule provided in Table 8. The feed stream was whole milk.

The sample was subjected to repeated CIP protocols (17×) and exhibited an unacceptable decline in the rejection of total solids (FIG. 17). The unacceptable performance of this sample was attributed to the high DS (greater than 80%) of the sPEEK used in the preparation of the rejection layer.

Sample 5

The performance of the sample was evaluated when used to recover permeate from fresh raw milk over a prolonged period of time (18 hours) at a constant pressure of 16 bar. A performance comparable with that of existing commercial operations was observed.

Sample 6

The sample was prepared to demonstrate the advantage provided by the inclusion of both cross-linking and hydrophilicitizing agents in the preparation of the rejection layer. The performance of the sample before and after a single CIP protocol according to the schedule provided in Table 8 was compared with that of Sample 1. Whereas the performance of the latter in terms of total solids rejection improved, the performance of Sample 6 deteriorated. The poor durability of the sample is attributed to the absence of cross-linking and interpenetration of the polymers of the backing layer and rejection layer of the composite membrane.

Samples 7 to 10

Figure 20:
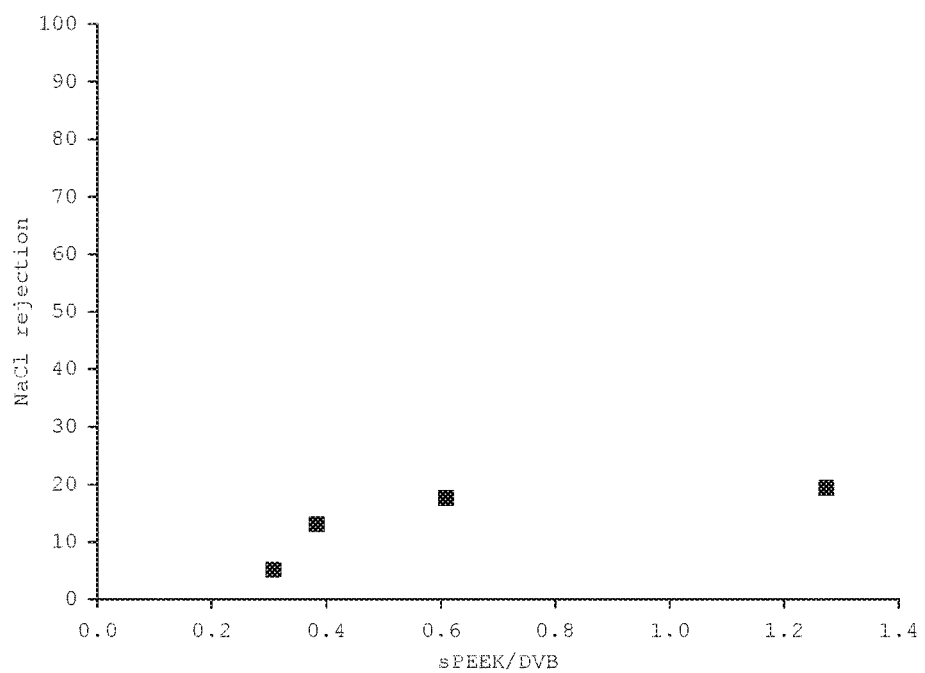
FIG. 20. Sodium chloride (NaCl) rejection (%) by Samples 7 to 10 of an asymmetric composite membrane prepared using different ratios of sPEEK and DVB in the preparation of the rejection layer. The feed stream was whole milk.
Figure 21:
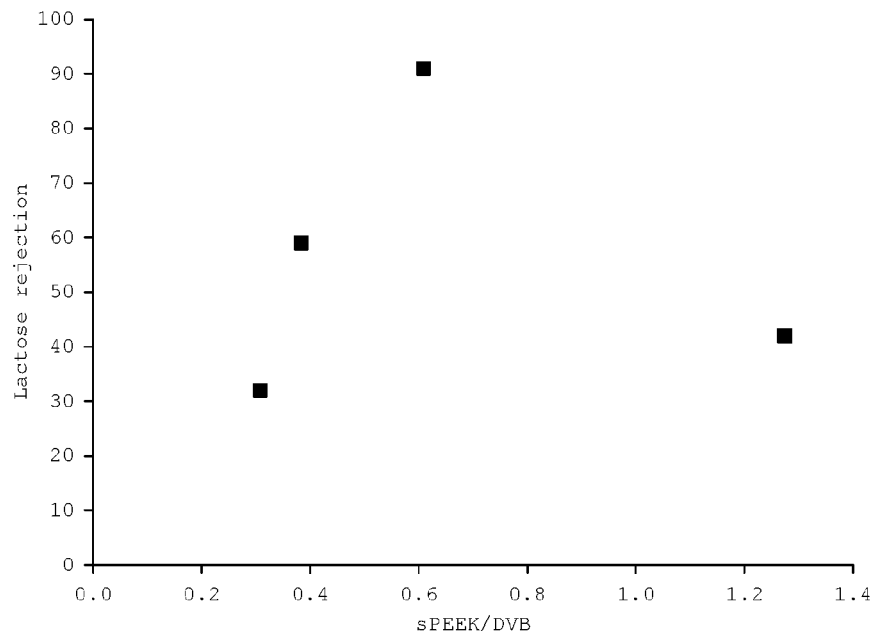
FIG. 21. Lactose rejection (%) by Samples 7 to 10 of an asymmetric composite membrane prepared using different ratios of sPEEK and DVB in the preparation of the rejection layer. The feed stream was whole milk.
Figure 22:
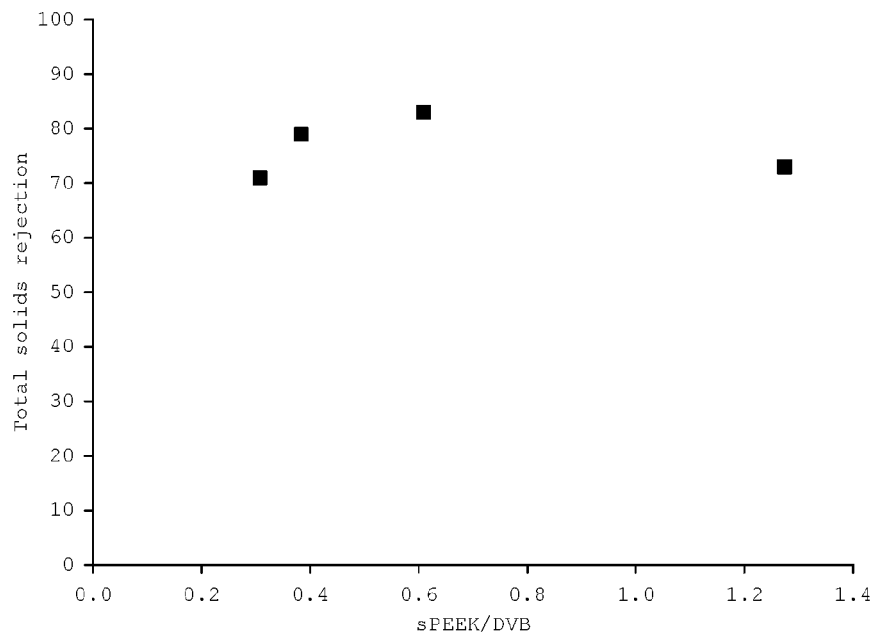
FIG. 22. Total solids rejection (%) by Samples 7 to 10 of an asymmetric composite membrane prepared using different ratios of sPEEK and DVB in the preparation of the rejection layer. The feed stream was whole milk.
Figure 23:
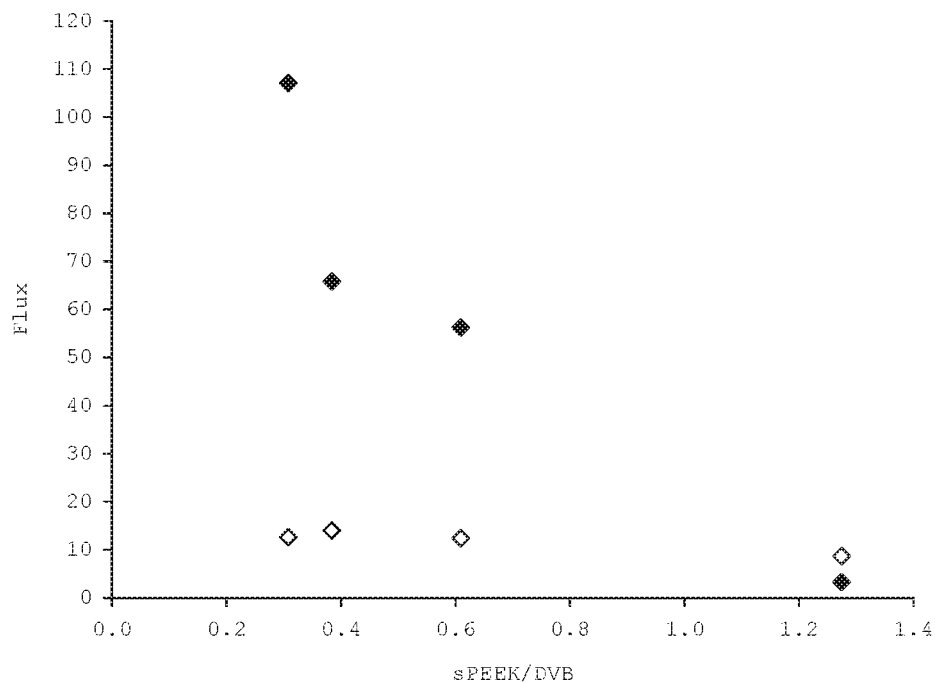
FIG. 23. Flux (LMH) for Samples 7 to 10 of an asymmetric composite membrane prepared using different ratios of sPEEK and DVB in the preparation of the rejection layer. The feed stream was either deionised water (♦) or whole milk (◇).

These samples were prepared to evaluate the influence the proportion of SPEEK used in the preparation of the rejection layer had on performance (in the absence of the hydrophilicitizing agent SSS). The non-linear relationship between the proportion of SPEEK used and sodium chloride rejection is consistent with an expected increase in the electric field gradient of the membrane and corresponding rejection of charged species (FIG. 20). The optimal lactose and total solids rejection was obtained for the sample with a molar ratio of sPEEK:DVB of 0.6 (FIGS. 21 and 22). The molar ratio of sPEEK:DVB that provided optimal flux was dependent on the feed stream (FIG. 23). For water the flux was highest for the sample with the lowest molar ratio of 0.3. For milk the flux was highest for the samples with the lower molar ratios. For both feed streams a high molar ratio of sPEEK:DVB was incompatible with a high flux.

Sample 11

Figure 24:
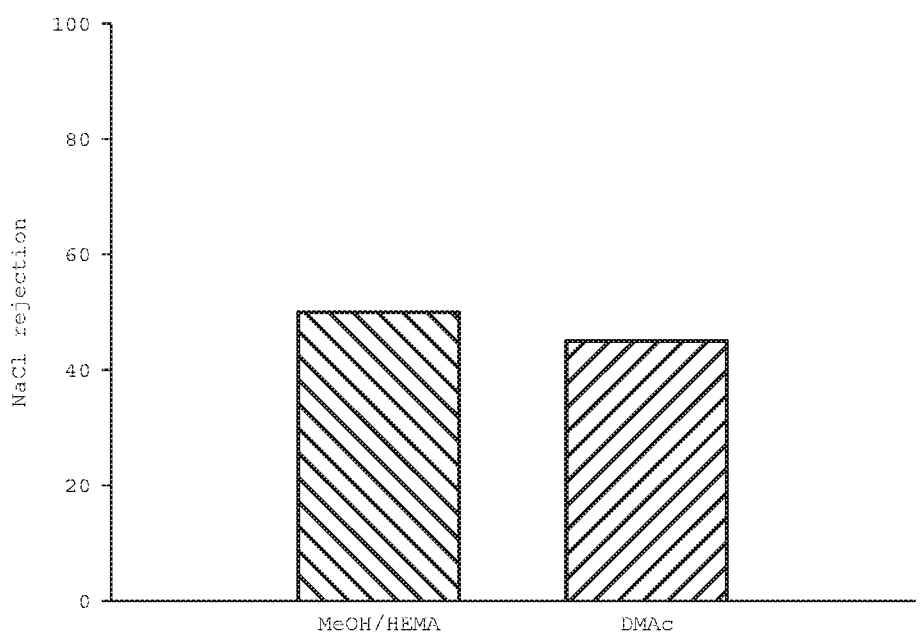
FIG. 24. Comparison of the sodium chloride (NaCl) rejection (%) for Sample 11 of an asymmetric composite membrane prepared using a different combination of solvent and hydrophilicitizing agent.
Figure 25:
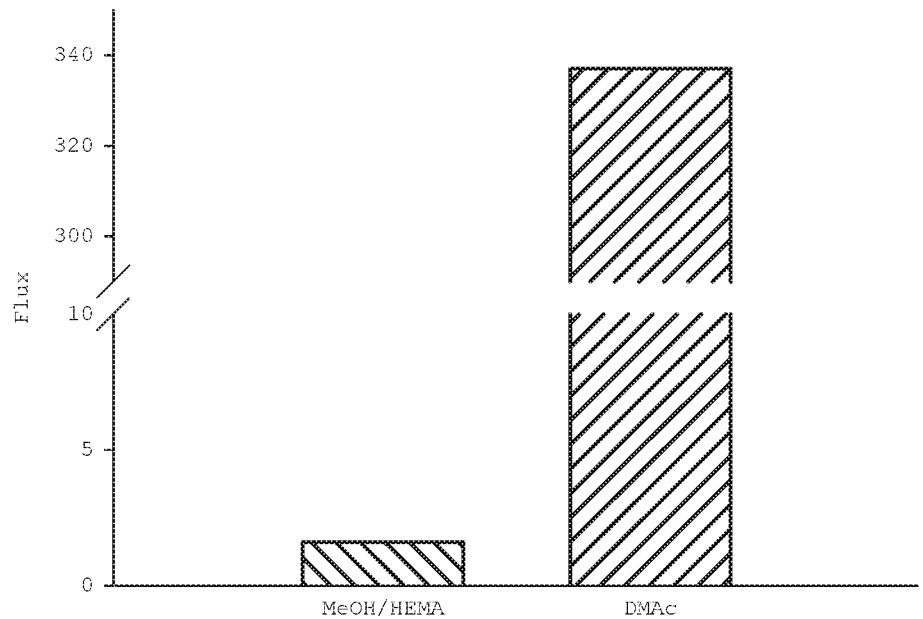
FIG. 25. Flux (LMH) for Sample 11 of an asymmetric composite membrane prepared using a different combination of solvent and hydrophilicitizing agent.
Figure 26:
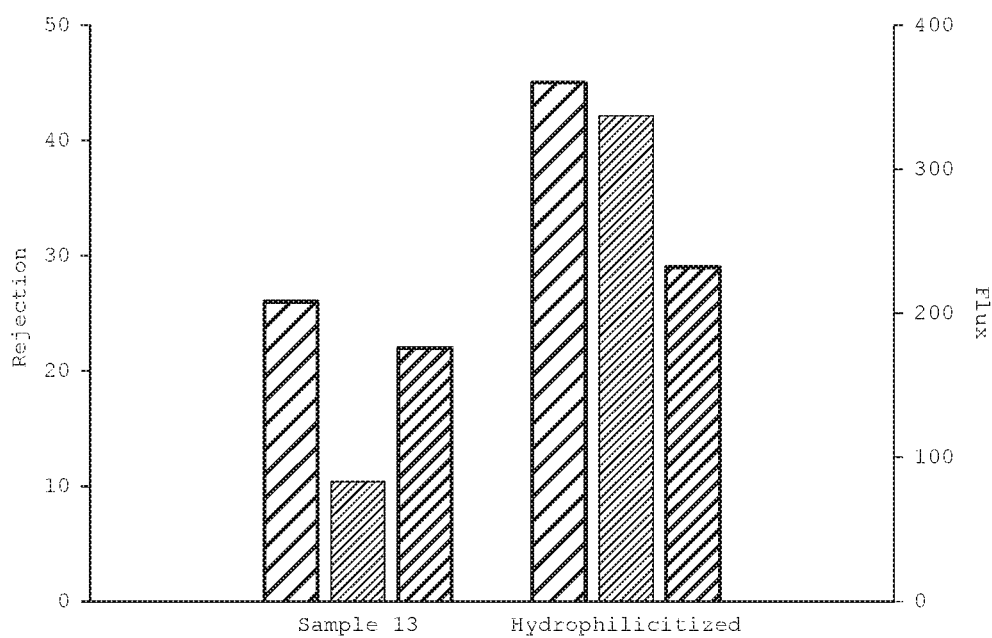
FIG. 26. Comparison of the sodium chloride (NaCl) rejection (%) (coarse diagonal hatching), flux (LMH) (fine diagonal hatching) and sucrose rejection (%) (medium diagonal hatching) for Sample 13 of an asymmetric composite membrane prepared using unmodified μPE as the backing layer and a sample of a symmetric composite membrane prepared using hydrophilic μPE as the backing layer.
Figure 27:
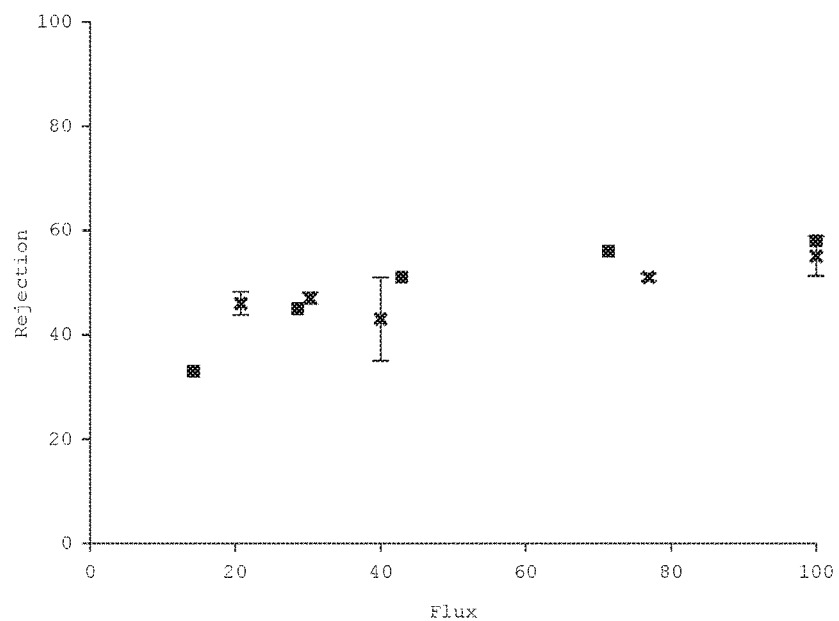
FIG. 27. Characterisation of Sample 13 using the Donnan Stearic Pore Model (DSPM) and curve fitting with sucrose as the uncharged solute.

The sample was prepared using a high (greater than 80%) solids content when preparing the rejection layer. In addition, HEMA was substituted for SSS as the hydrophilicitizing agent due to the poor solubility of the latter in methanol. An extended curing period of 10 minutes was employed. At a pressure of 20 bar the sample provided a comparable sodium chloride rejection (FIG. 24) but at a negligible flux (FIG. 25).

Sample 12

The sample was prepared using an unmodified μPE as the backing layer. This necessitated the use of acetone/water as the solvent for the rejection layer formulation. Pursuant to the use of this solvent the proportion of sPEEK was reduced and the proportion of SSS increased with a total solid content of 6% (w/w). The curing was performed in a sealed polyethylene bag to prevent flush evaporation of acetone during the curing period of five minutes. The performance of the sample at 20 bar in terms of flux and sodium chloride and sucrose rejection was poor when compared with the performance of an analogous sample prepared using a grafted, hydrophilicitized backing layer.

Although the invention has been described with reference to embodiments or samples it should be appreciated that variations and modifications may be made to these embodiments or samples without departing from the scope of the invention. Where known equivalents exist to specific elements, features or integers, such equivalents are incorporated as if specifically referred to in this specification. In particular, variations and modifications to the embodiments or samples that include elements, features or integers disclosed in and selected from the referenced publications are within the scope of the invention unless specifically disclaimed. The advantages provided by the invention and discussed in the description may be provided in the alternative or in combination in these different embodiments of the invention.

REFERENCED PUBLICATIONS

Allmer et al (1988) *Surface modification of polymers. I. Vapor-phase photografting with acrylic acid* Journal of Polymer Science, Part A: Polymer Chemistry, 26(8), 2099-111.

Allmer et al (1989) *Surface modification of polymers. II. Grafting with glycidyl acrylates and the reactions of the grafted surfaces with amines* Journal of Polymer Science: Part A: Polymer Chemistry, 27, 1641-1652.

Ang et al (1980) *Photosensitized grafting of styrene, 4-vinylpyridine and methyl methacrylate to polypropylene* Journal of Polymer Science: Polymer Letters Edition, 18, 471-475.

Anon (2014) DOW FILMTEC™ *Membranes—Cleaning procedures for DOW FILMTEC FT30 elements* Tech Fact (Form No. 609-23010-0211).

Bai et al (2011) *Surface UV photografting of acrylic acid onto LDPE powder and its adhesion* Shenyang Huagong Daxue Xuebao 25(2), 121-125.

Callahan et al (1990) Composite porous membranes and methods of making the same U.S. Pat. No. 4,976,897.

Callahan et al (1992) Membranes from UV-curable resins U.S. Pat. No. 5,102,552.

Causserand and Aimar (2010) 1.15 *Characterisation of filtration membranes* In *Comprehensive membrane science and engineering* Drioli, E; Giorna, L. eds. Oxford Elsevier.

Choi (2002) Graft polymerisation, separators, and batteries including the separators U.S. Pat. No. 6,384,100.

Choi (2004) Battery separator U.S. Pat. No. 6,680,144.

Choi (2005) Graft polymerisation, separators, and batteries including the separators U.S. Pat. No. 6,955,865.

Cussler et al (1992) Process for making microporous membranes having gel-filled pores and separations methods using such membranes U.S. Pat. No. 5,160,627.

Donato et al (1993) Composite porous membranes U.S. Pat. No. 5,266,391.

Donato et al (1994) Composite microporous membranes U.S. Pat. No. 5,294,346.

Donato, K. (1994) Composite porous membranes U.S. Pat. No. 5,294,342.

Drioli et al (2003) *Sulfonated PEEK-WC membranes for possible fuel cell applications* Journal of Membrane Science 228 (2004) 139-148.

Edge et al (1993) *Surface modification of polyethylene by photochemical grafting with 2-hydroxyethylmethacrylate* Journal of Applied Polymer Science, 47, 1075-1082.

El Kholdi et al (2004) *Modification of adhesive properties of a polyethylene film by phtografting* Journal of Applied Polymer Science 92(5), 2803-2811.

Fisher et al (1991) Microporous membranes having increased pore densities and process for making the same U.S. Pat. No. 5,013,439.

Gao et al (2013) Radiation cross-linked lithium-ion battery separator with high rupture temperature and high tensile strength and manufacture method Chinese patent application no. 2013-10196439 (publ. no. CN 103421208).

Gillberg-LaForce et al (1991) Modified microporous structures U.S. Pat. No. 5,049,275.

Gillberg-LaForce, G. (1994) Microporous membrane from cold-rolled precursor film U.S. Pat. No. 5,328,760.

Jones, Jr. (1990) Polybenzimidazole thin film composite membranes U.S. Pat. No. 4,933,083.

Kubota and Hata (1990a) *Distribution of methacrylic acid-grafted chains introduced into polyethylene film by photografting* Journal of Applied Polymer Science, 41, 689-695.

Kubota and Hata (1990b) *Benzil-sensitized photografting of methacrylic acid on low-density polyethylene film* Journal of Applied Polymer Science, 40, 1071-1075.

Ogiwara et al (1981) *Photosensitized grafting on polyolefin films in vapor and liquid phases* Journal of Polymer Science: Polymer Letters Edition, 19, 457-462.

Shentu et al (2002) *Factors affecting photo-grafting on low density polyethylene* Hecheng Suzhi Ji Suliao 19(3), 5-8.

Singleton et al (1993) Polymeric sheet International Application No. PCT/GB92/01245 (publ. no. WO 93/01622).

Tazuke and Kimura (1978) *Surface photografting. I. Graft polymerization of hydrophilic hydrophilicitizing agents onto various polymer films* Journal of Polymer Science: Polymer Letters Edition, 16, 497-500.

Xu and Yang (2000) *Study on the mechanism of LDPE-AA vapor-phase photografting system* Gaofenzi Xuebao (2000), 5, 594-598.

Yang and Ranby (1996) *Bulk surface photografting process and its applications. II. Principal factors affecting surface photografting* Journal of Applied Polymer Science, 63(3), 545-555.

Yao and Ranby (1990a) *Surface modification by continuous graft copolymerization. I. Photoinitiated graft copolymerization onto polyethylene tape film surface* Journal of Applied Polymer Science, 40, 1647-1661.

Yao and Ranby (1990b) *Surface modification by continuous graft copolymerization. III. Photoinitiated graft copolymerization onto poly(ethylene terephthalate) fiber surface* Journal of Applied Polymer Science, 41, 1459-1467.

Yao and Ranby (1990c) *Surface modification by continuous graft copolymerization. IV. Photoinitiated graft copolymerization onto polypropylene fiber surface* Journal of Applied Polymer Science, 41, 1469-1478.

Zhang and Ranby (1991) *Surface modification by continuous graft copolymerisation. II. Photoinitiated graft copolymerization onto polypropylene film surface* Journal of Applied Polymer Science, 43, 621-636.

The invention claimed is:

1. A method of preparing an asymmetric composite membrane comprising the steps:
    irradiating a dispersion comprising sulfonated poly(ether ether ketone) and at least one cross-linking agent in an organic solvent to provide a dispersion of partially cross-linked sulfonated poly(ether ether ketone);
    contacting one side of a sheet of microporous polyolefin wetted with a solution of a hydrophilicitizing agent in an aqueous solvent with the dispersion of partially cross-linked sulfonated poly(ether ether ketone);
    irradiating the one side of the coated sheet at a wave length and an intensity for a time sufficient to adhere the cross-linked sulfonated poly(ether ether ketone) to the sheet of microporous polyolefin to provide a composite; and then
    drying the composite at a temperature and time sufficient to provide the asymmetric composite membrane.

2. The method of claim 1 where the aqueous solvent is 40 to 60% (v/v) acetone in water.

3. The method of claim 2 where the hydrophilicitizing agent is 4-ethenyl-benzenesulfonic acid.

4. The method of claim 1 where the organic solvent is dimethylacetamide.

5. The method of claim 1 where the cross-linking agent is p-divinylbenzene.

6. The method of claim 1 where the dispersion additionally includes 4-ethenyl-benzenesulfonic acid.

7. The method of claim 1 where the dispersion comprises benzophenone.

* * * * *